United States Patent [19]
Abe

[11] Patent Number: 5,799,159
[45] Date of Patent: *Aug. 25, 1998

[54] DATA PROCESSING APPARATUS, NETWORK SYSTEM, AND METHOD OF CONTROLLING THE SAME

[75] Inventor: Yoshinori Abe, Tama, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 425,794

[22] Filed: Apr. 20, 1995

[30] Foreign Application Priority Data

Apr. 20, 1994 [JP] Japan .................... 6-082003

[51] Int. Cl.$^6$ .................... G06F 13/00
[52] U.S. Cl. .................... 395/287; 395/700.01
[58] Field of Search .................... 395/200.01, 522, 395/287

[56] References Cited

U.S. PATENT DOCUMENTS

| | | | |
|---|---|---|---|
| 4,858,114 | 8/1989 | Heath et al. .................... | 395/200.1 |
| 5,109,434 | 4/1992 | Shimizu et al. . | |
| 5,287,537 | 2/1994 | Newmark et al. .................... | 395/800 |
| 5,426,421 | 6/1995 | Gray .................... | 340/825.15 |
| 5,459,867 | 10/1995 | Adams et al. .................... | 395/700 |
| 5,493,408 | 2/1996 | Kurogane et al. .................... | 358/296 |
| 5,577,232 | 11/1996 | Priem et al. .................... | 395/500 |
| 5,586,324 | 12/1996 | Sato et al. .................... | 395/652 |

*Primary Examiner*—Ayaz R. Sheikh
*Assistant Examiner*—David A. Wiley
*Attorney, Agent, or Firm*—Morgan & Finnegan, L.L.P.

[57] ABSTRACT

There is suggested a network system capable of changing information on functions (e.g., completion of setting, permission of use, permission of accessing) set in a data processing apparatus which is connected to the network system by remote control through the network. In a network system to which a workstation, a multi-functional device (MFU 20), and the like, are connected, the MFU 20 has tables (command table, command permission table) containing information on processing functions which the MFU has (AE processing function, for instance). The workstation sends a command to the MFU 20 for making it set to a mode for changing contents of the tables, and the MFU 20 which received the command manages the functions of itself by controlling the contents of the tables.

44 Claims, 27 Drawing Sheets

FIG. 29

AE DATA REQUEST COMMAND

| 00 | 01 | 02 | 03 | 04 | |
|----|----|----|----|----|--|
|    |    |    |    |    |  |
|    |    |    |    |    |  |
|    |    |    |    |    |  |

COMMAND TABLE

FIG. 30

PERMISSION FLAG CORRESPONDING TO
AE DATA REQUEST COMMAND

10A

| 1 | 0 | 1 | 1 | 1 | |
|---|---|---|---|---|--|
|   |   |   |   |   |  |
|   |   |   |   |   |  |
|   |   |   |   |   |  |

COMMAND PERMISSION TABLE

F I G. 35

| TABLE CHANGING COMMAND = 10 ||
|---|---|
| DATA LENGTH ||
| NODE ID ||
| MANUFACTURER PASSWORD | USER PASSWORD |
| TABLE IDENTIFYING DATA ||
| ENTRY POINT | DATA |
| ⋮ | ⋮ |

5,799,159

1

DATA PROCESSING APPARATUS, NETWORK SYSTEM, AND METHOD OF CONTROLLING THE SAME

BACKGROUND OF THE INVENTION

The present invention relates to a data processing apparatus, a network system, and a method of controlling the same and, more particularly, to a data processing apparatus which is connected to a communication network and has a plurality of processing functions, a network to which a plurality of such data processing apparatus are connected, and a method of controlling them.

A conventional system is constructed in such a manner that a plurality of data processing apparatuses are connected to a communication network as shown in FIG. 1, for example.

The system is composed of various kinds of devices connected to a local area network (LAN) 13 which consists of optical cables and the like. The devices connected to the LAN 13 are workstations 10A and 10B capable of high speed processing, an image scanner 12B, a file server 14 for transmitting/receiving information (includes image data) from/to the workstations 10A and 10B to a storage medium through the LAN 13, a printer server 16 for controlling a printer, a facsimile server 18 for processing of facsimiles, a multi-functional device 20 having a various kinds of functions (e.g., copying, facsimile, filing, printing).

A magnetic disk device 15 for storing the information is connected to the file server 14, and a printer 17 for making hard copy of outputted information is connected to the printer server 16. Further, a MODEM 19 for electrically transmitting an image is connected to the facsimile server 18. Further, an image scanner 12A used for inputting image data is connected to the workstation 10A.

In the above construction, the workstation 10A or 10B checks whether or not any information is on the network. If there is, the workstation 10A or 10B puts a destination address (here, an address of a server or workstation) and its own address (an originated address) on the message (information) to be transmitted, and sends it to the LAN 13. By operating as described above, transmission of information to a desired server and reception of information from a server are performed.

Further, the multi-functional device 20 not only operates by itself as a copying machine, a facsimile machine, and the like, but also operates by remote control from a workstation, similarly to other external single functional devices.

In such devices that are to be connected to the LAN 13, standardization of controlling method, operativeness, and so on, has been made so that the devices of different type can be connected.

As a result of the standardization, the devices whose controlling method, operativeness and so on match to the standard can be connected even though the types of the devices are different from each other. However, if devices have unique function for themselves differing from functions of other devices, or functions of the devices are not known, it may be inconvenient to connect these devices. As a result, the connected devices suffer in that the operativeness is deteriorated.

For example, it is assumed that processing devices X and Y and a directive device Z (a host computer) are connected to a network, and that the processing device X has functions A, B, and C, whereas the processing device Y is a facsimile device of the same manufacturer as that of the processing device X and has functions A and B.

2

In most cases, a user seldom is aware that the processing device Y does not have the function C, since the processing devices X and Y are of the same manufacturer. Therefore, the user sometimes tries to operate the processing device Y to perform a process which requires the function C from the directive device Z, although the device Y does not have the function C. In such a case, the processing device Y has to reply with an error message to the directive device Z, and for doing so, the every processing devices must know all the functions that they can perform. Accordingly, a table or the like for storing functions of each device is required, however, such a management table has not been realized yet. Under the current situation, a command for the function C is tried to be executed in the processing device Y, and the directive device Z knows that the function C is not operated after it receives a status signal indicating execution error sent from the processing device Y. Namely, the directive device Z can know that the processing device Y can not perform the function C after the device Z sends an execution command to the device Y.

Further, many of the processing devices can install functions by option. For example, assume that the function C is optional and the processing device Y did not install the function C at first, but installed it later. In this case, even though the processing device Y has the aforesaid management table, if the system is not provided with a function to update the management table, the installed function C can be executed only by the device Y, but can not be used on the network.

Furthermore, there are cases where a function contains unique technology of the manufacturing company that developed the function. As a result, if there is a function called by an identical name, the detail of the function may differ depending on which manufacturer has developed the function. Accordingly, there will arise a problem in which the function that a user has originally expected can not be executed because the user has used a device, as a directive device, made by a different manufacturer from a manufacturer which developed the expected function. Therefore, in a system shown in FIG. 2, when there is a request to execute the function C of the processing device X from the host device W, the device has to reject the request as the host device W and device X do not have compatibility.

SUMMARY OF THE INVENTION

The present invention has been made in consideration of the above situation, and has as its object to provide a data processing apparatus which can be operated through a network to update information on functions (e.g., information such as completion of setting, permission of use, permission of access, etc.) set in the data processing apparatus connected to the network, and the network system.

According to the present invention, the foregoing object is attained by providing a data processing apparatus, connected to a communication network, having at least a single data processing function, comprising:

storage means for storing information on the processing functions; and mode setting means for setting a mode where said data processing function is able to change said stored information.

Further, the foregoing object is also attained by providing a network system connecting first and second data processing apparatuses, wherein wherein the first data processing apparatus out of the plurality of data processing apparatuses includes:

storage means for storing information on processing functions of said first data processing apparatus;

mode setting means for setting a mode where said first data processing apparatus is able to change the information; and receiving means for receiving a command for setting said first data processing apparatus to a mode for changing information, and wherein the second data processing apparatus, different from the first data processing apparatus out of the plurality of data processing apparatuses includes transmitting means for transmitting a command to said first data processing apparatus.

Furthermore, the foregoing object is also attained by providing a method of controlling a network system to which a plurality of data processing apparatuses are connected, comprising the steps of:

storing information on processing functions of said first data processing apparatus;

setting a mode where said first data processing apparatus is able to change said information; and transmitting a command for setting said first data processing apparatus to an information changing mode to said first data processing apparatus from a second data processing apparatus which is different from the first data processing apparatus out of the plurality of data processing apparatuses.

According to an aspect of the present invention, said information indicates functions executable of said data processing apparatus.

According to another aspect of the present invention, said information indicates permission/rejection to access, through the network, to the functions executable by said data processing apparatus through the network.

According to further aspect of the present invention, the data processing apparatuses can execute a plurality of functions, and the information is separately set for each of the plurality of functions.

According to yet another aspect of the present invention, the apparatus further comprises changing means for changing the stored information in the set mode.

According to yet another aspect of the present invention, confirmation is made prior to alteration of the information.

According to yet another aspect of the present invention, there is provided a network system capable of outputting the information visually.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 29 is a drawing showing an example of the command table;

FIG. 30 is a drawing showing an example of the command permission table;

FIG. 35 is a table illustrating a configuration of a command at changing the tables.

DETAILED DESCRIPTION OF THE PREFERRED EMBODIMENT

Preferred embodiment of the present invention will be described in detail in accordance with the accompanying drawings.

Figure 3:
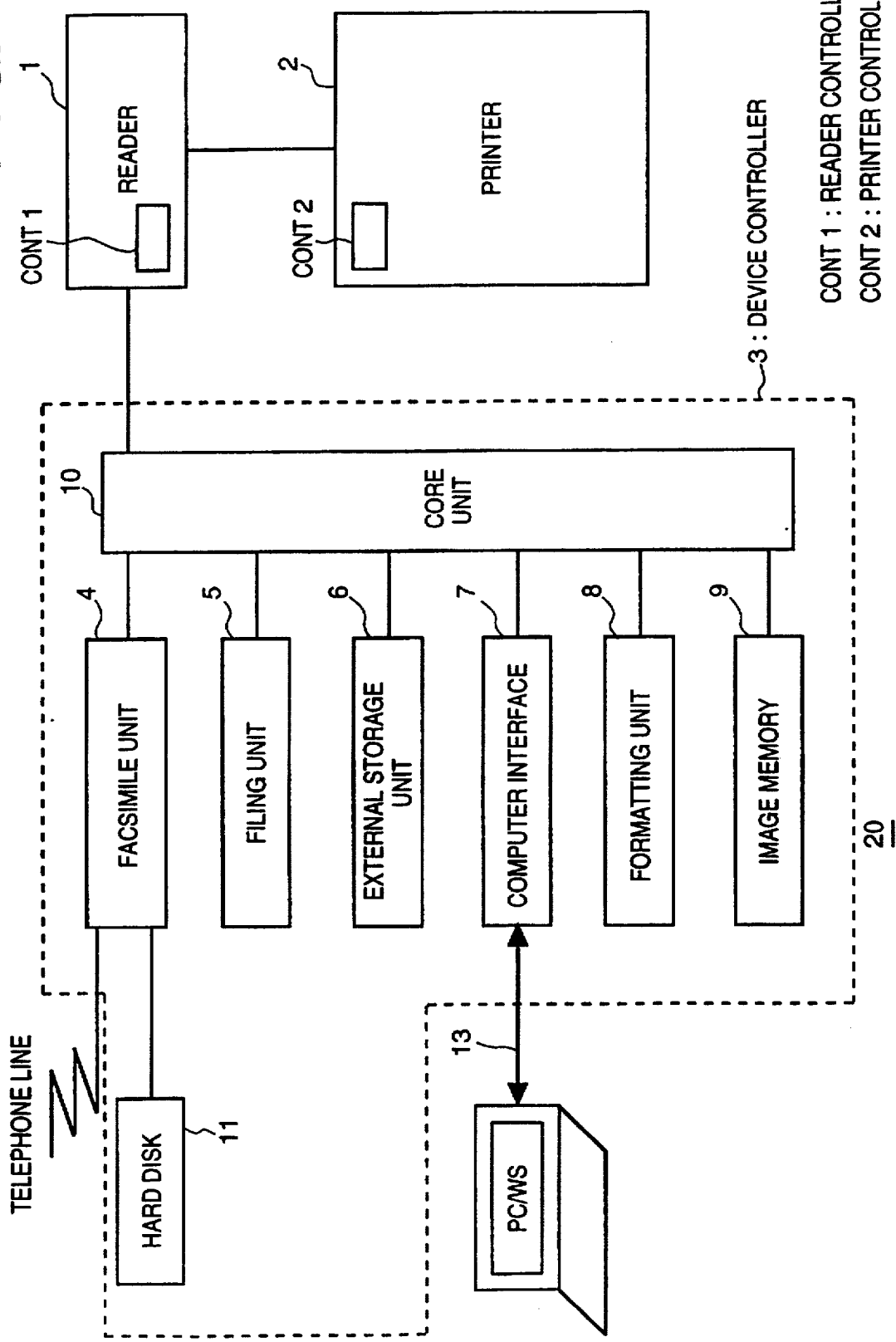
FIG. 3 is a block diagram showing a configuration of a multi-functional device (MFU) according to the embodiment.

FIG. 3 is a block diagram of a multi-functional apparatus (MFU) 20 as a data processing apparatus according to the embodiment of the present invention.

Brief Construction of the MFU

Figure 1:
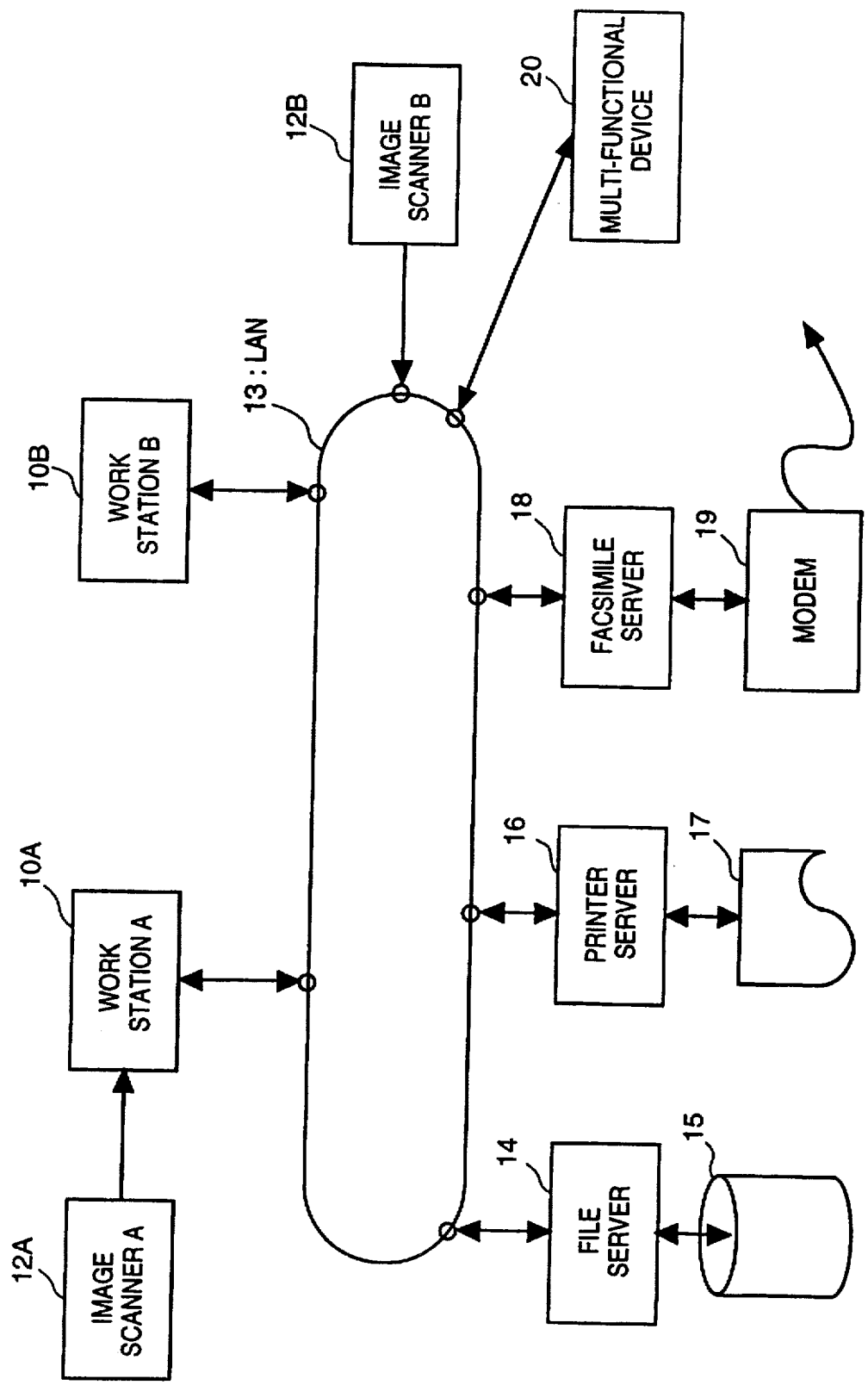
FIG. 1 is a drawing illustrating a configuration of a network to which either a conventional data processing apparatus or a data processing apparatus according to an embodiment of the present invention is connected.
Figure 2:
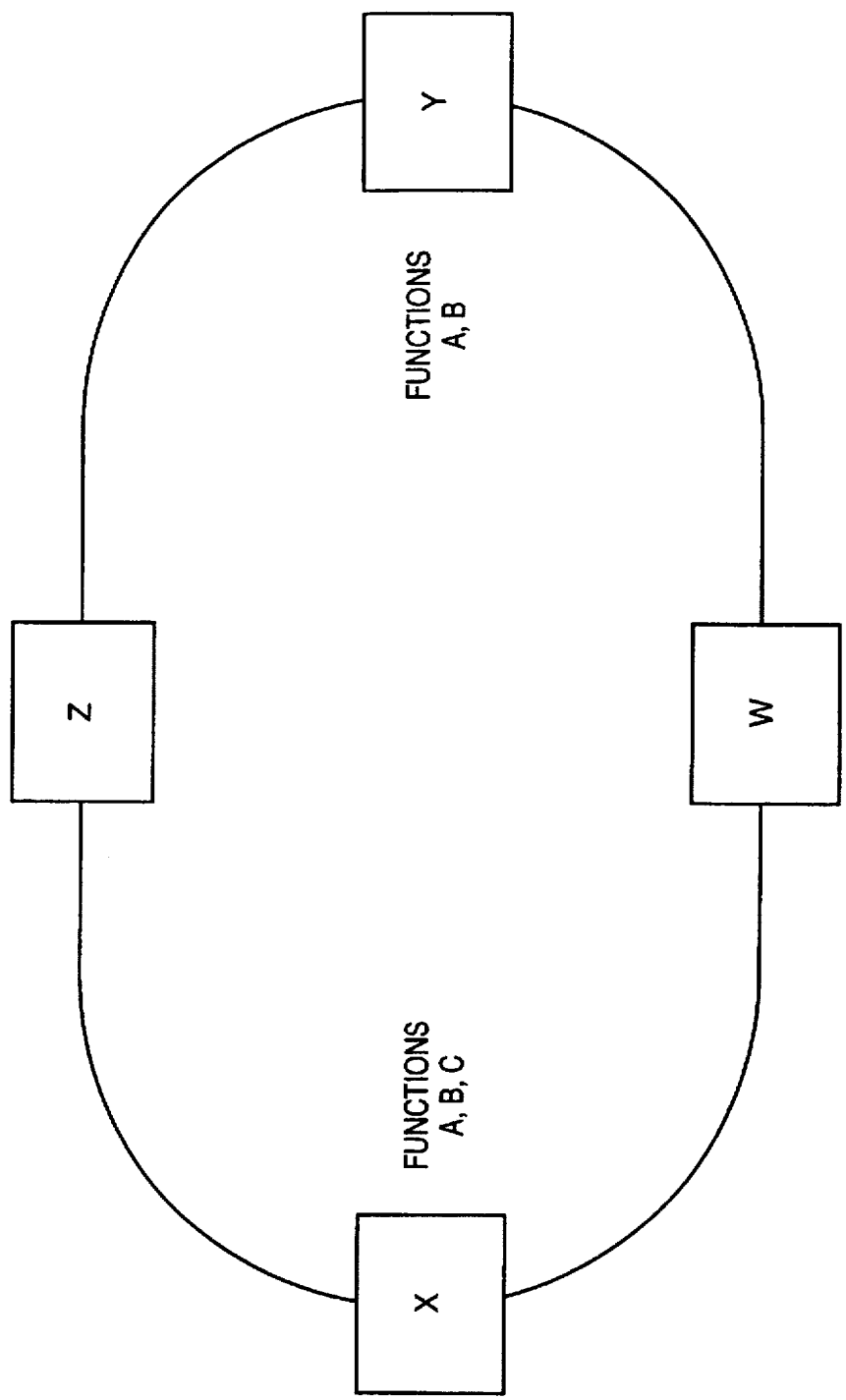
FIG. 2 is a drawing explaining a network suffering inconvenience caused by functional differences of connected devices.

The MFU 20 is connected to a network system as shown in FIG. 1, and has a facsimile function (facsimile unit 4), a filing function (filing unit 5 and storage unit 6), a printing function (printer 2), and an image scanning function (reader 1).

These units operate in corporation with other devices connected to the network in FIG. 1. For example, where a user uses a workstation to scan an image and uses a printing function of the MFU 20 to print out the image is considered, the user uses the workstation 10A to control the scanner 12A to scan the image, edits the image in the workstation 10A, and designates the MFU 20 by using a print command to print out the image.

In order to make use of the reading function of the MFU 20 to scan an image, an image scanning command is sent from the workstation to the MFU 20 to control it scanning the image. In the MFU 20 in FIG. 3, reference numeral 1 denotes an image inputting unit (reader) for processing data of an original image and converting to image data; 2, an image outputting unit (printer), having a plurality of cassettes for storing different kinds of recording paper sheets, for outputting the image data on a recording paper sheet in correspondence with a print instruction; and 3, a device controller, electrically connected to the reader 1, having various kinds of functions. The device controller 3 comprises the facsimile unit 4, the filing unit 5, the external storage unit 6 connected to the filing unit 5, a computer interface 7 for connecting a computer and other information processing devices via the LAN 13, a formatting unit 8 for visualizing information from the computer connected to the LAN 13, an image memory 9 for storing information from the reader 1 and for temporary storing image information from the LAN 13, and a core unit 10 for controlling each processing performed by the aforesaid functions.

The computer interface 7 communicates with devices on the network, e.g., each device shown in FIG. 1.

Further, CONT 1 of the reader 1 is a controller for the reader 1, and CONT 2 of the printer 2 is a controller of the printer 2. CONT 1 and CONT 2 (via CONT 1) are designed to be capable of communicating with the core unit 10 of the device controller 3, and have CPU, ROM, and RAM.

Reader/Printer

Figure 4:
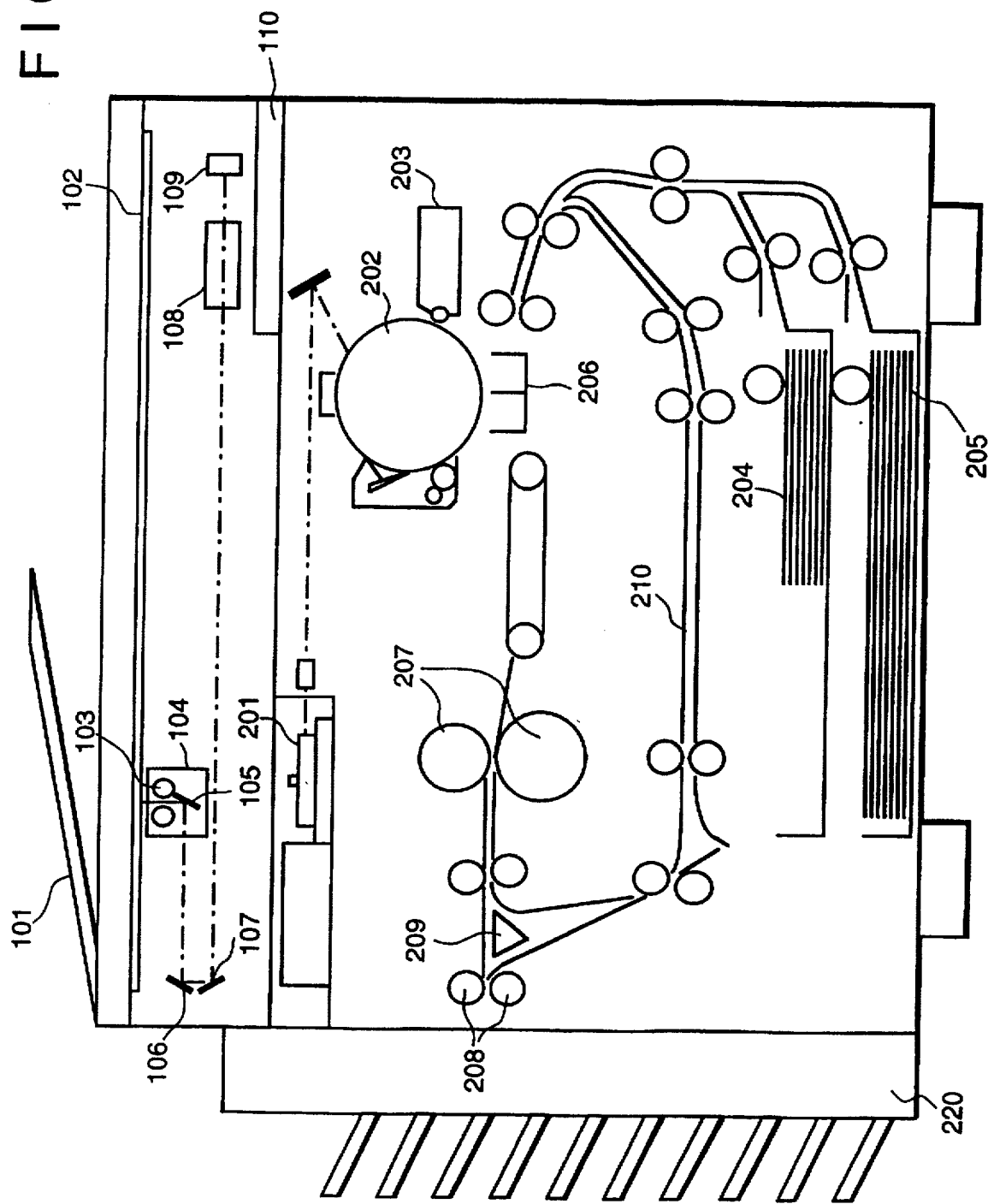
FIG. 4 is a drawing illustrating a construction of a reader and a printer of the MFU.

FIG. 4 is a cross sectional view for explaining a construction of the reader 1 and the printer 2 which are shown in FIG. 3. The construction and operation will be described below.

An original placed on the document feeder 101 is conveyed to a platen glass 102 one at a time. When the original is conveyed to a predetermined position of the platen glass 102, a lamp 103 of the scanner is switched on and the scanner unit 104 moves, thereby the original is illuminated. The reflected light from the original is color-decomposed by a mirrors 105, 106, 107, a lens 108, and an RGB filter which is not shown, then inputted into a CCD image sensor 109 (referred as "CCD", hereinafter). The reflected light, illuminating the CCD 109, of the original is photoelectric-converted in the CCD 109. The converted electric signal is sent to the image processing unit 110.

The image processing unit 110 performs image processes set by various kinds of controllers. Note that an external switching circuit of the image processing unit 110 has a selector (not shown) for switching to either the printer 2 or the device controller 3 to send a signal from the reader 1, further has a function for selecting a signal either from the reader 1 or from a device controller 3 and sending to the printer 2.

The electric signal sent to the printer 2 by the external switching circuit of the image processing unit 110 is converted into a modulated optical signal in a exposure controller 201, and incidents on a electrostatic drum 202. A latent image formed on the electrostatic drum 202 by the incident light is developed by a developer 203.

With proper timing with the top edge of the latent image, a transfer paper sheet is conveyed from a transfer sheet storage unit 204 or 205, and in a transferring unit 206, the developed image is transferred. After the transferred image is fixed on the transfer paper sheet in the fixing unit 207, the sheet is discharged to the outside by a discharging unit 208.

As shown in FIG. 3, the device controller 3 is connected to the reader 1 through a cable, and controls signals in the core unit 10 of the device controller 3 and other functions. The device controller 3 comprises the facsimile unit 4 for performing facsimile transmission and reception, the filing unit 5 for converting various kinds of information on an original into electric signals and storing the signals in a magneto-optical disk, the formatting unit 8 for developing code information from a computer into image information, the computer interface 7 for interfacing with the LAN and the computer, the image memory 9 for storing information from the reader 1 and temporary storing information from the computer, and the core unit 10 for controlling functions of aforesaid units. The core unit 10 is responsible for interchanging command/status signal with each functional board, thereby controlling the whole device controller unit 3. The core unit 10 operates in accordance to a command for external devices inputted from the computer via the LAN.

Figure 5:
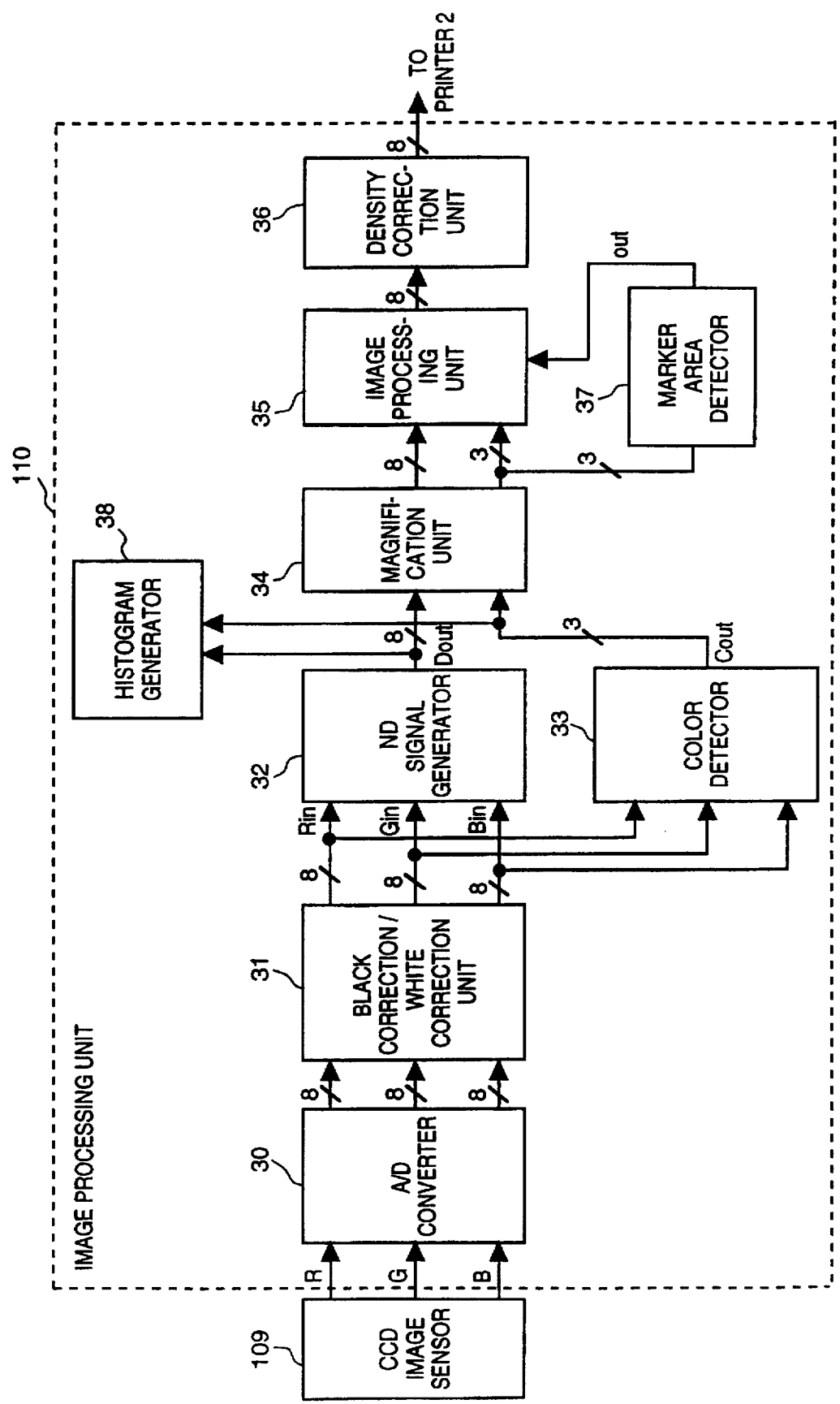
FIG. 5 is a block diagram showing an internal configuration of an image processing unit.

FIG. 5 is a block diagram illustrating an internal configuration of the image processing unit 110. In FIG. 5, reference numeral 30 denotes an A/D converter; 31, a black correction/white correction unit; 32, a ND signal generator; 33, a color detector; 34, a magnification unit; 35, an image processing unit; 36, a density correction unit; 37, a marker area detector; and 38, a histogram generator.

The operation of the image processing unit having the above-described configuration is next described.

An image signal inputted from the CCD image sensor 109 is converted into a digital signal (8 bits) by the A/D converter 30. Then, after being processed with corrections in a black level and a white level (shading correction) at the black correction/white correction unit 31, each RGB signal is inputted to the ND signal generator 32 and the color detector 33.

In the ND signal generator 32, RGB signals are added and divided by 3, thereby a luminance signal $D_{out}$ is outputted, as described by following equation.

$$D_{out}=(R_{in}+G_{in}+B_{in})/3$$

Note that the equation above shows an ideal case, and in practice, each RGB signal is multiplied by a coefficient first, then added.

The color detector 33 outputs the RGB signals as a 3 bit color signal $C_{out}$ which is classified into white, black, red, green, blue, pink, yellow, and orange, where the last three colors are colors of high-lighters (not shown), depending on the ratio of RGB signals.

The luminance signal $D_{out}$ and the color signal $C_{out}$ are applied with the magnification or displacement process in the main scanning direction (in the moving direction of a CCD) in the magnification unit 34, then inputted into the image processing unit 35. The image processing unit 35 performs processes, such as hatching, patterning for converting the color information into a pattern of monochromatic color, masking, trimming, and black-and-white inversion.

After that, the signals $D_{out}$ and $C_{out}$ are applied with luminance-density conversion and with density correction for the printer in the density correction unit 36, then outputted to the printer 2.

The luminance signal $D_{out}$ and the color signal $C_{out}$ respectively outputted from the ND signal generator 32 and the color detector 33 are inputted into a histogram generator 38, then a histogram is generated. More color information is added to the histogram if necessary.

Further, the color signal $C_{out}$ is used for detecting an area designated by a marker. More specifically, the marker area detector 37 detects the area designated by the maker in accordance with the color signal $C_{out}$, then sends information on the area as an area signal to the image processing unit 35. The image processing unit 35 performs processes, such as the black-and-white inversion and hatching, on the basis of the area signal.

Facsimile Unit

Figure 6:
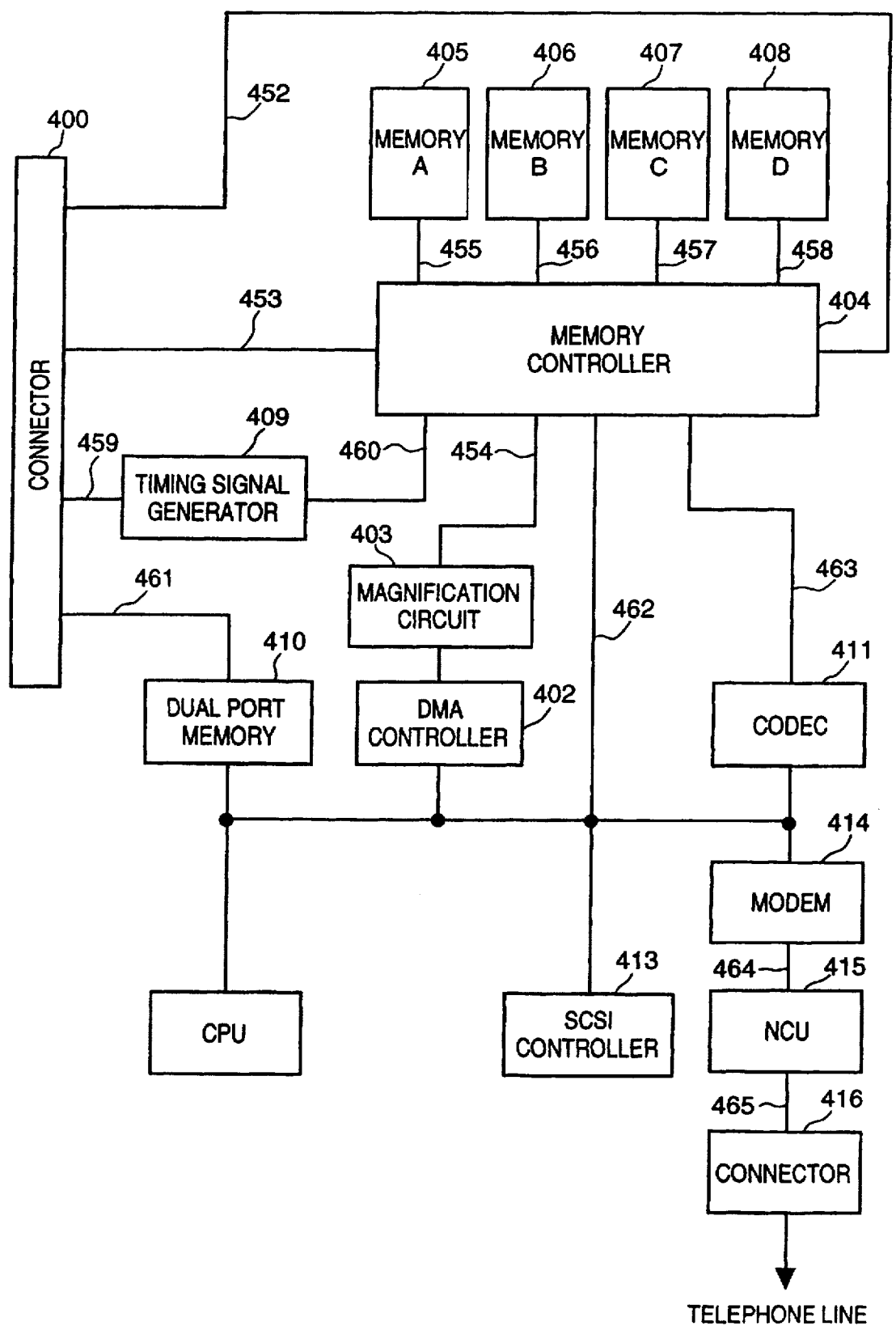
FIG. 6 is a block diagram showing a configuration of a facsimile unit of the MFU.

Referring to FIG. 6, the facsimile unit 4 will be next described in detail.

The facsimile unit 4 is connected to the core unit 10 via a connector 400 through which various kinds of signals are interchanged. In order to store binary information from the core unit 10 in one of the memories 405 to 408, a signal from the connector 400 is inputted into a memory controller 404 through a signal line 453, and stored in one of the memories A405, B406, C407, and D408, or in two memories in cascade connection out of aforesaid memories under control of the memory controller 404.

The memory controller 404 has five modes: a mode for interchanging data with memories A405, B406, C407, D408 and a CPU bus 462 in response to an instruction from a CPU 412; a mode for interchanging data with a CODEC bus 463 of a CODEC 411 having encoding and decoding functions; a mode for interchanging contents of the memories A405, B406, C407, and D408 with a magnification circuit 403 through a bus 454 under control of a DMA controller 402; a mode for storing binary video input data 460 in one of the memories A405, B406, C407, and D408 under control of a timing signal generator 409; and a mode for outputting the contents of the one of the memories A405, B406, C407, and D408 to a read signal line 452.

Each of the memories A405, B406, C407, and D408 has a capacity of 2 Mbyte, stores data corresponding to an image of A4 size in resolution of 400 dpi. The timing signal generator 409 is connected to the connector 400 via a signal line 459, and starts operating in correspondence with a control signals (HSYNC, HEN, VSYNC, and VEN) from the core unit 10, and generates a signal for achieving following two functions.

The first function is to store an image signal from the core unit 10 in one of the memories A405, B406, C407, and D408 or two cascaded memories. The second function is to read the contents from one of the memories A405, B406, C407, and D408 and transmit the read contents to the signal line 452.

A dual port memory 410 connects to the CPU 1003 of the core unit 10 via the signal line 461 and to the CPU 412 of the facsimile unit 4 via the signal line 462. The CPUs interchanges commands through the dual port memory 410.

A SCSI controller 413 interfaces with a hard disk 11 (FIG. 3) connected to the facsimile unit 4. The hard disk 11 stores facsimile data during transmitting or receiving facsimile, and the like. The CODEC 411 reads image information stored in one of the memories A405, B406, C407, and D408, and encode the image information in a desired method out of MH, MR, and MMR methods, then one of the memories A405, B406, C407, and D408 stores the coded image information. Further, the CODEC 411 reads coding information stored in the memories A405, B406, C407, and D408, and decodes data in a corresponding method out of the MH, MR, and MMR methods, then one of the memories A405, B406, C407, and D408 stores the decoded information as image information.

A MODEM 414 has functions to modulate the coding information from the CODEC 411 or from the hard disk 11 connected to the SCSI controller 413 so as to transmit the information to a telephone line, demodulate to convert information from an NCU 415 into the coding information, and transmit the coding information to the CODEC 411 or the hard disk 11 connected to the SCSI controller 413. The NCU 415 is directly connected to a telephone line, and interchanges information with a telecommunication switching device provided at a telephone central office, and the like, in a predetermined operational sequence.

The expansion circuit 504 expands the previously compressed image information for subsequent transmission to other processors on the network via signal line 555.

Filing Unit 5

Figure 7:
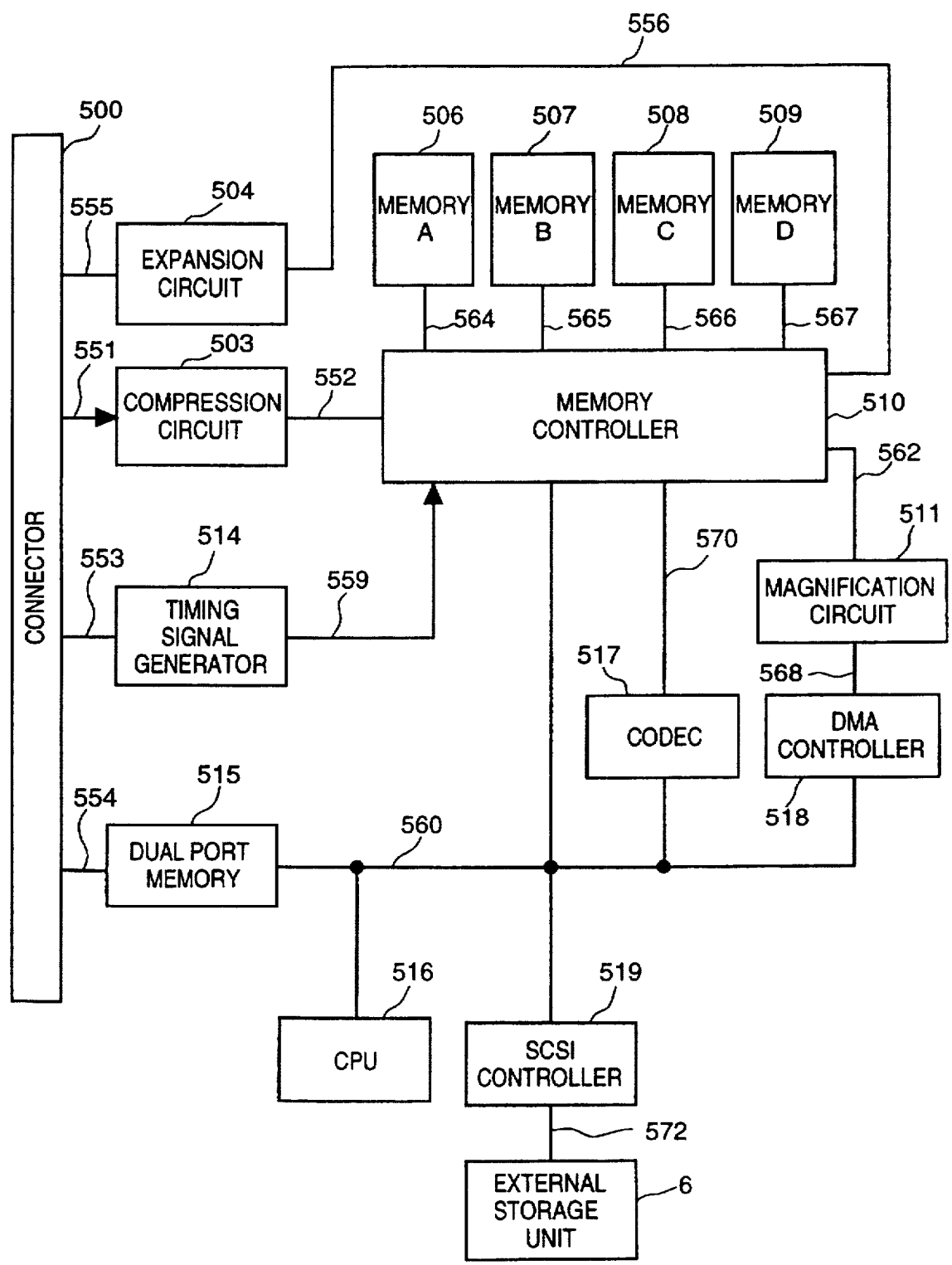
FIG. 7 is a block diagram showing a configuration of a filing unit of the MFU.

FIG. 7 is a block diagram showing a detailed configuration of the filing unit 5. Referring to FIG. 5, the configuration and operation of the filing unit 5 will be described below.

The filing unit 5 is connected to the core unit 10 via a connector 500, thus interchanges various kinds of signals. A multiple value input signal on the signal line 551 is inputted to a compression circuit 503 where multiple image information is converted into compressed information and outputted to a memory controller 510. A signal on an output signal line 552 from the compression circuit 503 is stored in one of memories A506, B507, C508, and D509 or two cascaded memories out of the above memories under control of the memory controller 510. The memory controller 510 has five modes: a mode for interchanging data with the memories A506, B507, C508, D509, and a CPU bus 560 in accordance with an instruction by the CPU 516; a mode for interchanging data with a CODEC bus 570 of a CODEC 517 performing encoding and decoding; a mode for interchanging the contents of the memories A506, B507, C508, and D509 with the magnification circuit 511 via a bus 562 under control of a DMA controller 518; a mode for storing a signal on a signal line 553 in one of the memories A506, B507, C508, and D509 under control of a timing signal generator 514; and a mode for reading contents of one of the memories A506, B507, C508, and D509, and outputting the read contents to a signal line 556.

Each of the memories A506, B507, C508, and D509 has a capacity of 2 Mbyte, and stores data of an image of A4 size in resolution of 400 dpi. The timing signal generator 514 is connected to the connector 500 via the signal line 553 and starts operating in accordance with control signals (HSYNC, HEN, VSYNC, and VEN) from the core unit 10, then generates a signal for achieving the following two functions. The first function is to store information from the core unit 10 in one of the memories A506, B507, C508, and D509 or two cascaded memories, and the second function is to read image information from one of the memories A506, B507, C508, and D509 and transmit the information to the signal line 556.

A dual port memory 515 is connected to the CPU 1003 of the core unit 10 via a signal line 554, to the CPU 516 of the filing unit 5 via a signal line 560. Thereby, the CPUs of the core unit 10 and the filing unit 5 can interchange command through the dual port memory 515.

An SCSI controller 519 interfaces with the external storage unit 6 which is connected to the filing unit 5. The external storage unit 6 is composed of a magneto-optical disk and stores data such as image information. A CODEC 517 reads image information stored in one of the memories A506, B507, C508, and D509, and encodes the image information in a desired method out of MH, MR, and MMR methods, then one of the memories A506, B507, C508, and D509 stores the coded image information. Further, the CODEC 517 reads coding information stored in the memories A506, B507, C508, and D509, and decodes data in a corresponding method out of the MH, MR, and MMR methods, then one of the memories A506, B507, C508, and D509 stores the decoded information as image information.

Computer Interface

Figure 8:
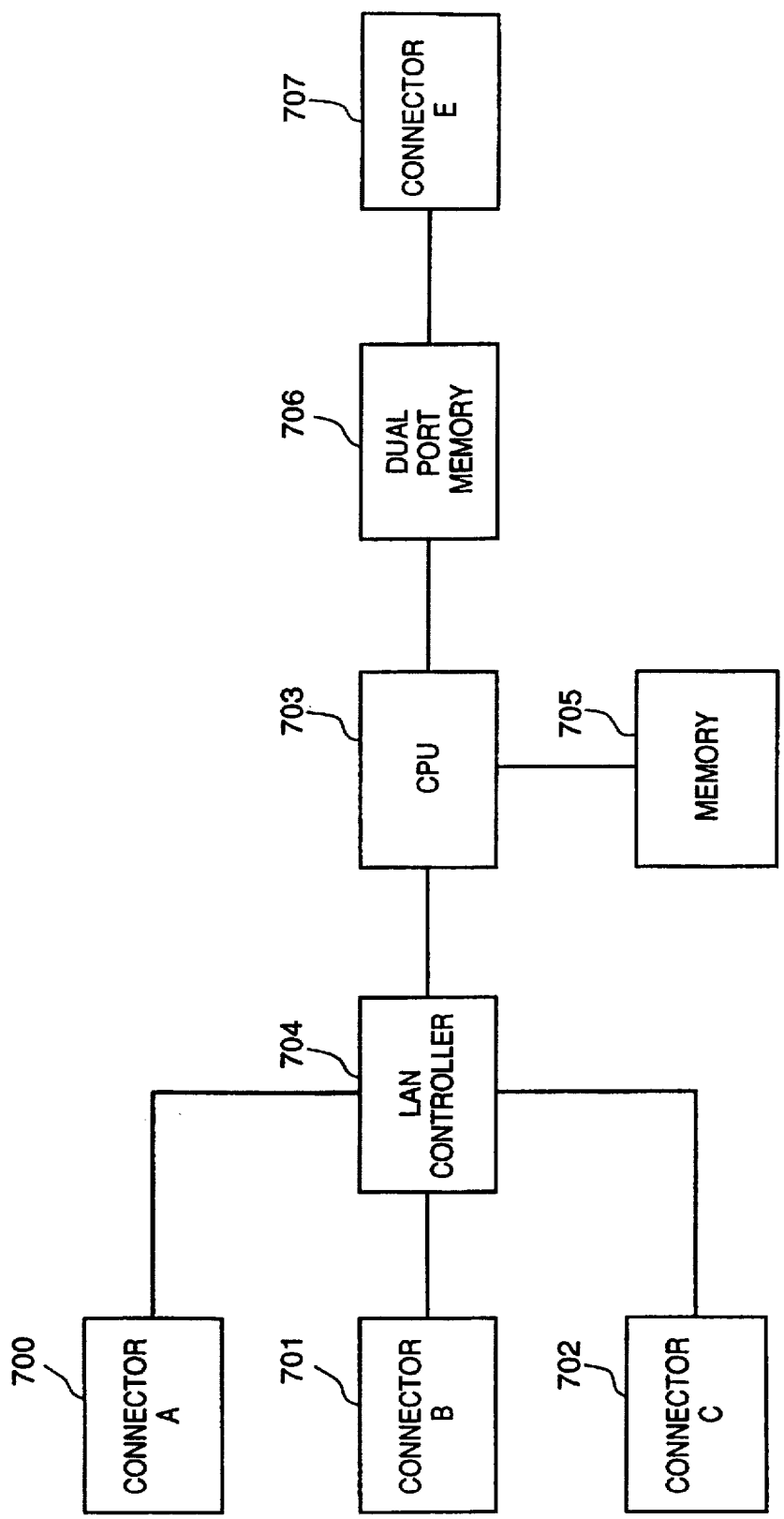
FIG. 8 is a block diagram showing a configuration of a computer interface of the MFU.

Next, referring to FIG. 8, the computer interface 7 is described.

The LAN 13 here is an Ethernet type.

In FIG. 8, a connector A 700 is for an Ethernet interface for a 10BASE5, a connector B 701 is for an Ethernet interface for a 10BASE2, and a connector C 702 is for an Ethernet interface for a 10BASE-T. The computer interface 7 selects one of the above three connectors to physically connect to the Ethernet. Further, a CPU 703 communicates by controlling an Ethernet I/F controller referring to volatile or non-volatile memory included in a memory 705. A connector 707 is for connecting to the core unit 10, and the CPU 703 communicates with the core unit 10 via a dual port memory 706.

Core Unit 10

Figure 9:
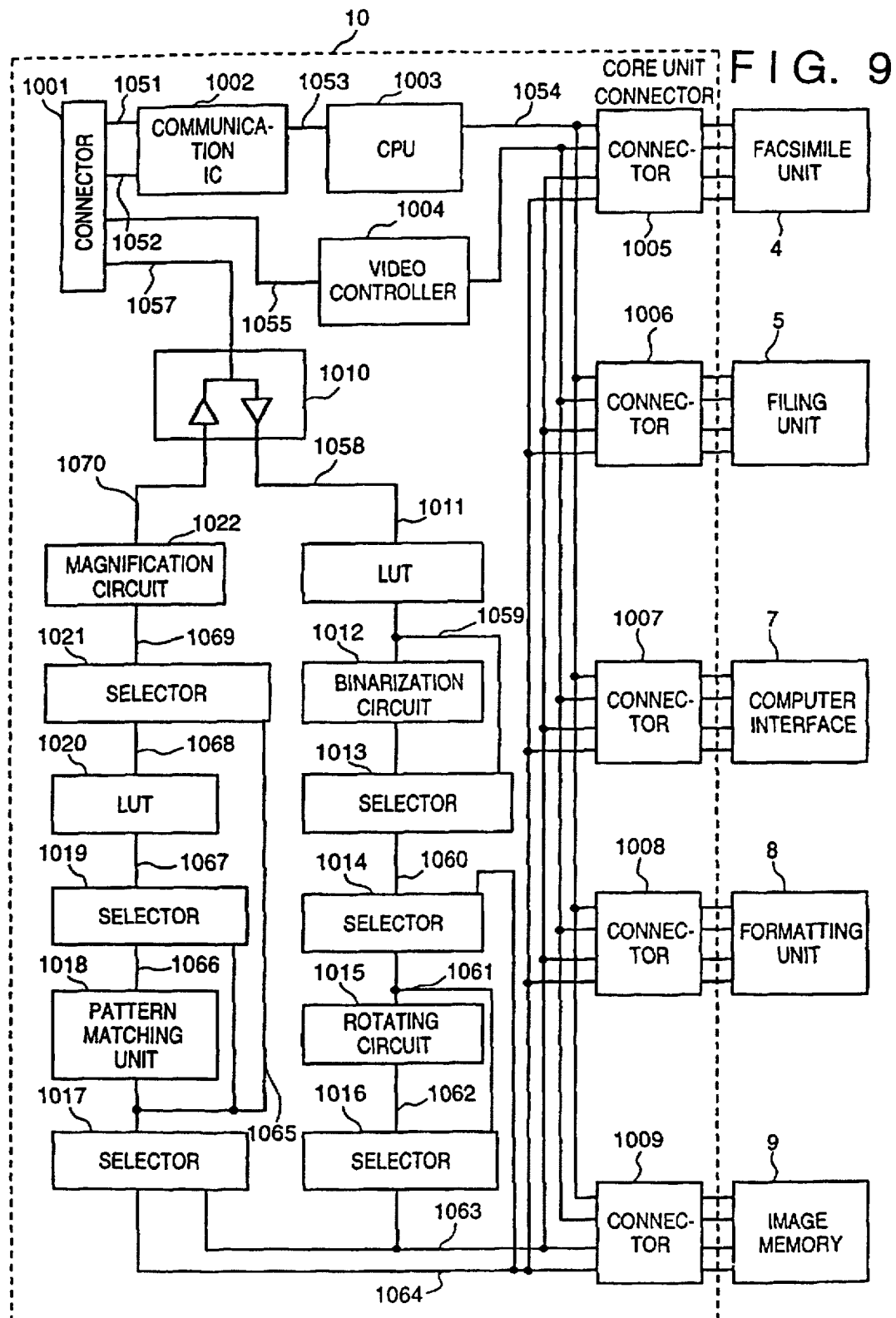
FIG. 9 is a block diagram showing a configuration of a core of the MFU.

A construction of the core unit 10 will be next described with reference to FIG. 9.

A connector 1001 of the core unit 10 is connected to a connector 120 of the reader 1 by a cable. The connector 1001 includes signal line for transmitting four kinds of signals. An 8 bit multiple value video signal is transmitted via a signal line 1057, a control signal for controlling a video signal is transmitted via a signal line 1055, a signal for communicating with a CPU 122 of the reader 1 is transmitted via a signal line 1051, and a signal for communicating with a sub CPU 123 of the reader 1 is transmitted via a signal line 1052. Signals on the signal line 1051 and the signal line 1052 are processed with a communication protocol by a communication IC 1002, and communication information is transmitted to the CPU 1003 via a CPU bus 1053.

The signal line 1057 carries a bi-directional video signals, thus it is possible to receive information from the reader 1 in the core unit 10 or to output information from the core unit 10 to the reader 1. The signal line 1057 is connected to a buffer 1010 where the signal line 1057 is divided into two signal lines 1058 and 1070 which transmit signals in the opposite direction.

The signal line 1058 carries an 8 bit multiple value video signal which is inputted to a LUT (look up table) 1011, downstream. The LUT 1011 converts image information from the reader 1 into the desired value by referring to a table. An output signal line 1059 from the LUT 1011 is connected to a binarization circuit 1012 or a selector 1013. The binarization circuit 112 has a simple binarization function of binarizing a multiple value signal on the signal line 1059 in a fixed slice level, a binarization function performed in accordance with a changing slice level which changes depending upon values of neighboring pixels of a pixel of interest, and a binarization function by an Error diffusion method. Information which is binarized by the binarization circuit 1012 is converted to a multiple value signal of "$00_H$" if the binarized information is "0", and "$FF_H$" if it is "1", and inputted into the selector 1013 in downstream. Note, "H" indicates the hexadecimal notation.

A signal from the LUT 1011 or an output signal from the binarization circuit 1012 is inputted to the selector 1013 which selects one of these signals. An output signal line 1060 from the selector 1013 is connected to a selector 1014. The selector 1014 selects either a signal on a signal line 1064 from the core unit 10 to which output video signals from the facsimile unit 4, the filing unit 5, the computer interface 7, the formatting unit 8, and the image memory 9 are inputted via connectors 1005, 1006, 1007, 1008, and 1009, respectively, or a signal on the output signal line 1060 of the selector 1013 in accordance with an instruction from the CPU 1003.

The signal thus selected by the selector 1014 is outputted to a signal line 1061 and further inputted into a rotating circuit 1015 or a selector 1016. The rotating circuit 1015 has a function of rotating the inputted image signal by +90 degrees, −90 degrees, and +180 degrees. The rotating circuit 1015 stores information which is outputted from the reader 1 and converted into a binary signal by the binarization circuit 1012 as a signal from the reader 1. Next, corresponding to an instruction from the CPU 1013, the rotating circuit 1015 rotates to read the stored information.

The selector 1016 selects either the output signal from the rotating circuit 1015 or the input signal to the rotating circuit 1015, then outputs the selected signal to a signal line 1063. The signal line 1063 is connected to the connector 1005 of the facsimile unit 4, the connector 1006 of the filing unit 5, the connector 1007 of the computer interface unit 7, the connector 1008 of the formatting unit 8, the connector 1009 of the image memory 9, and a selector 1017. It should be noted that the signal line 1063 is a synchronization type 8 bit single directional video bus for transmitting image information from the core unit 10 to the facsimile unit 4, the filing unit 5, the computer interface 7, the formatting unit 8 and the image memory 9. Further, the signal line 1064 is a synchronization type 8 bit single directional video bus for transmitting image information from the facsimile unit 4, the filing unit 5, the computer interface 7, the formatting unit 8 and the image memory 9.

It is a video controller 1004 that controls synchronization type buses of these signal lines 1063 and 1064 via an output signal line 1056 from the video controller 1004. Each of the connectors 1005 to 1009 is also connected to a signal line 1054 from the CPU 1003. The signal line 1054 is a bi-directional 16 bit CPU bus, and data and commands are interchanged in non-synchronization manner through this signal line 1054. Interchange of information between the facsimile unit 4, the filing unit 5, the computer interface 7, the formatting unit 8 or the image memory 9 and the core unit 10 is performed via the two signal lines 1063 and 1064 and the CPU bus 1054.

The signal line 1064 coming from the facsimile unit 4, the filing unit 5, the computer interface 7, the formatting unit 8, and the image memory 9 is connected to the selectors 1014 and 1017. The selector 1016 inputs a signal on the signal line 1064 to the rotating circuit 1015 in accordance with an instruction of the CPU 1003.

The selector 1017 selects either a signal on the signal line 1063 or a signal on the signal line 1064 according to an instruction of the CPU 1003. An output signal line 1065 coming from the selector 1017 is connected to a pattern matching unit 1018, selectors 1019 and 1021. The pattern matching unit 1018 compares the signal on the signal line 1065 to predetermined patterns, and when the pattern of the signal matches to one of the predetermined patterns, the pattern matching unit 1018 sends a predetermined multiple value signal to the signal line 1066. On the other hand, when patterns do not match each other, the signal on the signal line 1065 is outputted to the signal line 1066 without being changed.

The selector 1019 selects a signal either on the signal line 1065 or on the signal line 1066 in accordance with an instruction by the CPU 1003. The output signal line 1067 from the selector 1019 is connected to a LUT 1020 in downstream. The LUT 1020 converts a signal from the signal line 1067 when it outputs image information to a printer 2 so that the type of signal fits characteristics of the printer 2. A selector 1021 selects a signal either on an output signal line 1068 of the LUT 1020 or on the signal line 1065 in accordance with an instruction by the CPU 1003.

The output signal from the selector 1021 is then inputted into a magnification circuit 1022. The magnification circuit 1022 is able to set magnification ratio in the X and Y directions independently in accordance with an instruction of the CPU 1003. The magnification method is one dimensional linear interpolation method. The output signal line 1070 from the magnification circuit 1022 is connected to a buffer 1010. A signal on a signal line 1070 inputted into the buffer 1010 is transmitted through the bi-directional signal line 1057 in accordance with an instruction from the CPU 1003, further transmitted to the printer 2 via the connector 1001, then printed out.

A flow of a signal in the core unit and other units will be described below.

Operation of the Core Unit 10 Corresponding to Information of the Facsimile Unit 4

Next, a case where information is outputted to the facsimile unit 4 will be explained. The CPU 1003 communicate with the CPU 122 of the reader 1 via a communication IC 1002, and issues an scanning instruction to scan and read an original. In accordance with the scanning instruction, the reader 1 controls the scanner unit 104 to scan and read an original, and outputs the obtained image information to the connector 120. The reader 1 is connected to the device controller (external device) 3 by a cable, and the information from the reader is inputted into the connector 1001 of the core unit 10. The image information inputted into the connector 1001 is then inputted into the buffer 1010 through the 8 bit multiple value signal line 1057. The buffer 1010 input the signal on the bi-directional signal line 1057 to the LUT 1011 as a single directional signal via the signal line 1058 in accordance with an instruction of the CPU 1003.

The LUT 1011 converts the image information from the reader 1 into a desired value by using a look up table. By performing this conversion, it becomes possible to perform a process, such as elimination of background of the original image, for instance. An output signal line 1059 from the LUT 1011 is connected to the binarization circuit 1012, downstream. The binarization circuit 1012 converts a signal on the 8 bit multiple value signal line 1059 to a binary signal.

If the binarized signal is "0", then the binarization circuit 1012 converts it into a multiple value signal, "00H", and if the binarized signal is "1", then the binarization circuit 1012 converts it into a multiple value signal, "$FF_H$". A signal outputted from the binarization circuit 1012 is inputted to the rotating circuit 1015 or the selector 1016 via the selectors 1013 and 1014. A signal on the output signal line 1062 of the rotating circuit 1015 is also inputted into the selector 1016, and the selector 1016 selects a signal either on the signal line 1061 or on the signal line 1062. The selection of the signal is decided by a CPU 1003 by communicating with the facsimile unit 4 via the CPU bus 1054. A signal on the output signal line 1063 from the selector 1016 is sent to the facsimile unit 4 through the connector 1005.

A case where information is received from the facsimile unit 4 will be next explained.

Image information from the facsimile unit 4 is transmitted to the signal line 1064 via the connector 1005. The signal line 1064 is connected to the selectors 1014 and 1017. In order to rotates and output data of an original image which is received via the facsimile unit to a printer 2 in accordance with an instruction from the CPU 1003, a signal on the signal line 1064 connected to the selector 1014 is rotated in the rotating circuit 1015. The output signal from the rotating circuit 1015 is inputted into the pattern matching circuit 1018 via the selectors 1016 and 1017.

In order to output an original image which is received via the facsimile unit to a printer 2 without rotating the image in accordance with an instruction from the CPU 1003, a signal on the signal line 1064 connected to the selector 1017 is selected and inputted into the pattern matching circuit 1018. The pattern matching circuit 1018 has a function to smooth the coarse original image received via facsimile. The pattern matched signal is inputted into the LUT 1020 via the selector 1019. A table of the LUT 1020 can be changed by the CPU 1003 in order to output the image received via facsimile by the printer 2 in a desired density. The output signal from the LUT 1020 is inputted into the magnification circuit 1022 via the selector 1021.

The magnification circuit 1022 magnifies 8 bit multiple value data having either one of two values ($00_H$ and $FF_H$) by using the one dimensional linear interpolation method. The 8 bit multi-value signal outputted from the magnification circuit 1022 is sent to the reader 1 via the buffer 1010 and the connector 1001. The reader 1 inputs this signal into an external I/F switching circuit 119. The external I/F switching circuit 119 transmits a signal from the facsimile unit 4 to a Y signal generator/color detector 113. An output signal from the Y signal generator/color detector 113 is applied with processes as described above, and outputted to the printer 2 where an image is formed on a recording paper sheet.

Operation of the Core Unit 10 Corresponding to Information of the Filing Unit 5

Next, a case where information is outputted to the filing unit 5 will be explained.

The CPU 1003 communicates with a CPU 122 of the reader 1 via the communication IC 1002, and issues a scanning instruction to scan an original to the reader 1. The reader 1 controls the scanner unit 104 to scan the original in accordance with the scanning instruction and outputs obtained image information to the connector 120. The reader 1 is connected to the device controller (external device) 3 by a cable, and information from the reader 1 is inputted into the connector 1001 of the core unit 10. The image information inputted into the connector 1001 is outputted to the single directional signal line 1058 by the buffer 1010. The 8 bit multiple value signal on the signal line 1058 is converted into a desired signal by the LUT 1011. An output signal from the LUT 1011 is inputted to the connector 1006 via the selectors 1013, 1014, and 1016. Therefore, the unprocessed 8 bit multiple value signal is transmitted to the filing unit 5 without processed by the binarization circuit 1012 and the rotating circuit 1015. In order to file a binarized signal by communicating with the filing unit 5 via the CPU bus 1054 of the CPU 1003, the functions of the binarization circuit 1012 and the rotating circuit 1015 are used. The processes by the binarization circuit 1012 and the rotating circuit 1015 is the same as those described above, thus omitting the explanation.

Next, a case where information is received from the filing unit 5 will be described.

Image information from the filing unit 5 is inputted to the selector 1014 or 1017 via the connector 106 as a signal on a signal line 1064. Here, if the information is filed as 8 bit multiple value signals, it is inputted into the selector 1017, and if filed as binarized signals, it can be inputted into either selector 1014 or 1017. If filed as binarized signals, the flow of the information is the similar to that of data interchanged between the core unit 10 and the facsimile unit 5 thus omitting the explanation.

In a case where the information is to be filed as multiple value signals, a signal on the output signal line 1065 from the selector 1017 is inputted to the LUT 1020 via the selector 1019. In the LUT 1020, a look up table is made in accordance with an instruction from the CPU 1003 so as to fit to a desired printing density. The output signal from the LUT 1020 is inputted into the magnification circuit 1022 via the selector 1021. Then, the 8 bit multiple value signal which is magnified by a desired magnification ratio in the magnification circuit 1022 is sent to the reader 1 via the buffer 1010 and the connector 1001. The information sent to the reader 1 from the filing unit 5 is outputted to the printer 2 in the same manner as the transmission of data with the facsimile unit 4 described above, then an image is formed on a recording paper sheet.

Operation of the Core Unit 10 Corresponding to Information of the Computer Interface 7

The computer interface 7 interfaces to a network (LAN 13) to which the device controller (external device) 3 is connected. There are 10BASE5, 10BASE2, and 10BASE-T available as network interfaces. The computer interface 7 has these three kinds of interfaces, for example, and information through a selected interface is transmitted to the CPU 1003 via the connector 1007 and the data bus 1054. The CPU 1003 performs various kinds of controls in accordance with the contents of the transmitted information.

Formatting Unit 8

Figure 10:
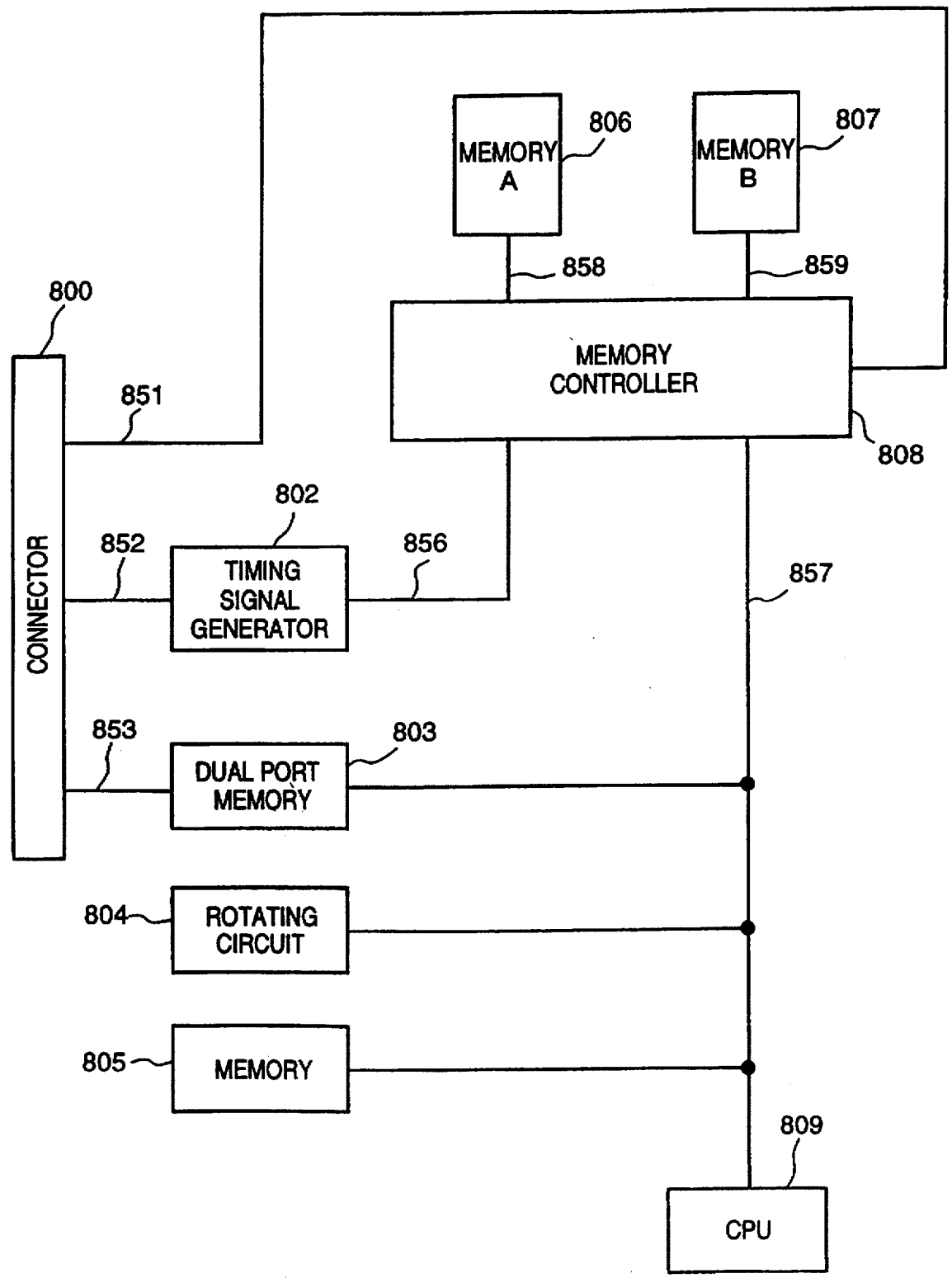
FIG. 10 is a block diagram showing a configuration of a formatting unit of the MFU.

Referring to FIG. 10, the formatting unit 8 will be next explained.

Data form the aforesaid computer interface 7 is examined at the core unit 10, and if the data relates to the formatting unit 8, the CPU 1003 of the core unit 10 transmits the data from the computer to a dual port memory 803 via a connector 1008 of the core unit 10 and a connector 800 of the formatting unit 8. A CPU 809 of the formatting unit 8 receives coded data sent from the network via the dual port memory 803. The CPU 809 sequentially develops the coded data into image data, and outputs the image data to a memory 806 or 807 via a memory controller 808.

The memory 806 or 807 has memory capacity of 1 Mbyte, and can store data representing an A4 size image in resolution of 300 dpi. In order to store data representing to an image of greater than A4 size and of less than A3 size in resolution of 300 dpi, image data is developed on the cascaded memories 806 and 807. The control of the aforesaid memories are performed by the memory controller 808 in accordance with an instruction of the CPU 809. At developing the image data, if characters or figures are to be rotated, they are rotated by a rotating circuit 804 then transmitted to the memory 806 or 807.

When the image data has been thus developed in the memory 806 or 807, the CPU 809 controls the memory controller 808, and either a data bus line 858 of the memory 806 or the data bus line 859 of the memory 807 is connected to an output line 855 of the memory controller 808. Next, the CPU 809 communicates with the CPU 1003 of the core unit 10 via the dual port memory 803, and sets to a mode in which image information is outputted from the memory 806 or 807. The CPU 1003 of the core unit 10 sets CPU 122 to a print output mode by using a communication function included in the CPU 122 of the reader 1 via the communication circuit 1002 in the core unit 10.

When the print output mode is set, the CPU 1003 of the core unit 10 controls a timing signal generator 802 to start operating via the connector 1008 and the connector 800 of the formatting unit 8. The timing signal generator 802 generates a timing signal used by the memory controller 808 for taking timing to read the image information from the memory 806 or 807 in accordance with a signal from the core unit 10. The image information from the memory 806 or 807 is inputted into the memory controller 808 via the signal line 858. An output image information from the memory controller 808 is transmitted to the core unit 10 via a signal line 851 and the connector 800. Regarding the process of outputting an image from the printer 2 controlled by the core unit 10, it has been already explained above, thus omitting the explanation.

Operation of the Core Unit 10 Corresponding to Information of the formatting unit 8

The formatting unit 8 has a function of developing command data, such as a document file, transmitted from the aforesaid computer interface 7, into image data. If the CPU 1003 determines that data sent from the computer interface 7 via the data bus 1054 has to do with the formatting unit 8, the CPU 1003 transmits the data to the formatting unit 8 via the connector 1008. The formatting unit 8 develops into a visual image (characters, figures, and the like) on the basis of the transmitted data.

Next, an operational sequence for receiving information from the formatting unit 8 and forming an image on a recording paper sheet will be explained.

Image information from the formatting unit 8 is transmitted to the signal line 1064 as a multiple value signal having either one of the values ($00_H$ or $FF_H$) via the connector 1008. The signal on the signal line 1064 is inputted to the selectors 1014 and 1017. The selectors 1014 and 1017 are controlled in accordance with an instruction of the CPU 1003. Subsequent operational sequence is the same as that of the facsimile unit 4, thus omitting the explanation.

Image Memory 9

Figure 11:
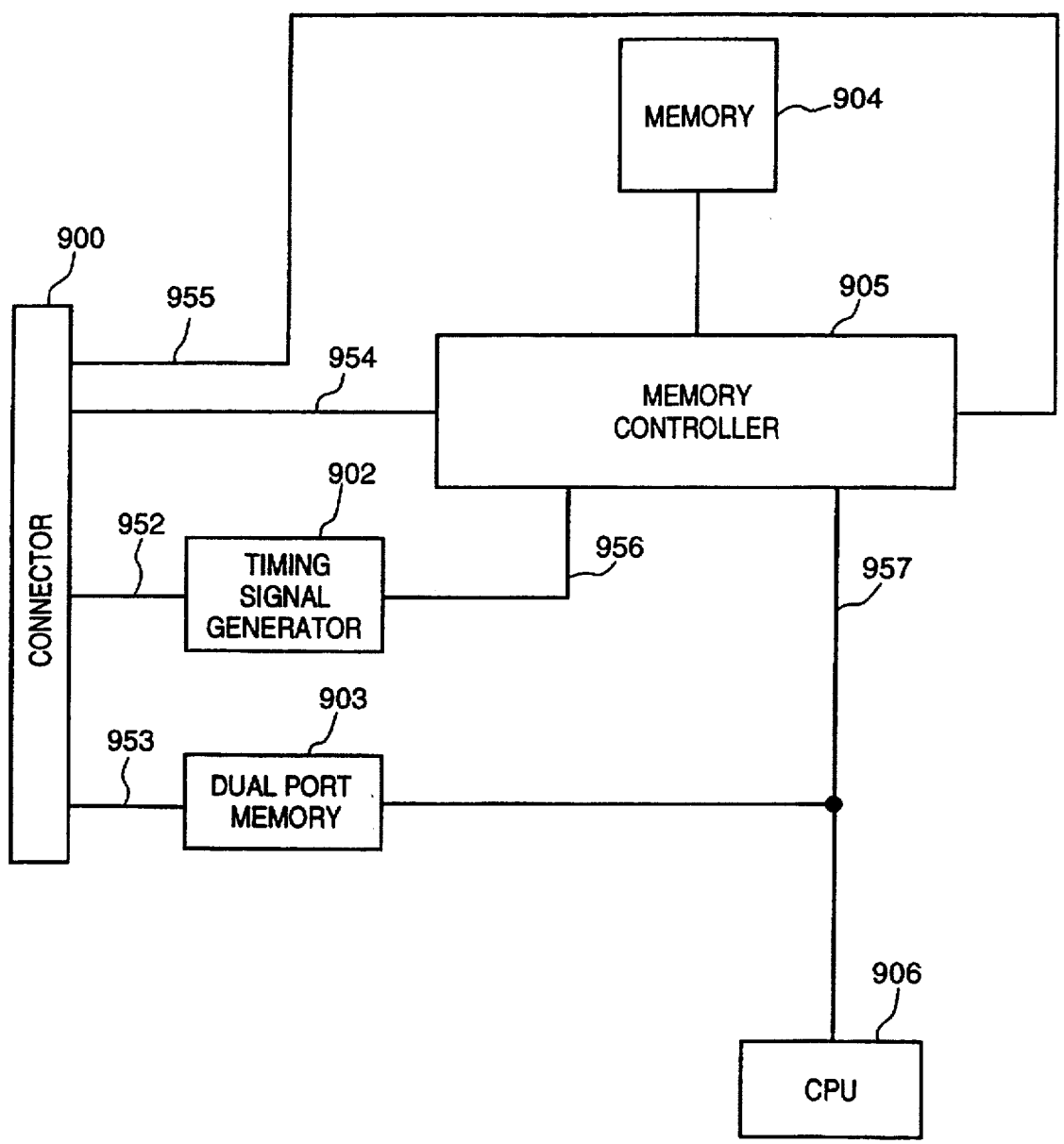
FIG. 11 is a block diagram showing a configuration of an image memory of the MFU.

Next, referring to FIG. 11, a construction and operation of the image memory 9 will be explained. The image memory 9 is connected to the core unit 10 via a connector 900, and interchanges various kinds of signals between them. A multiple value input signal on a signal line 954 is stored in a memory 904 under control of a memory controller 905. The memory controller 905 has three modes, which are a mode for interchanging data between the memory 904 and a CPU bus 957, a mode for storing a signal on a signal line 954 in the memory 904 under control of a timing signal generator 902, and a mode for reading the contents stored in the memory 904 and outputting them to a signal line 955.

The memory 904 has a memory capacity of 32 Mbytes, for instance, and is able to store an image of A3 size or equivalent in a resolution of 400 dpi and in 256 tones. The timing signal generator 902 is connected to the connector 900 via a signal line 952. The timing signal generator 902 is trigged by a control signal (HSYND, HEN, VSYNC, and VEN) from the core unit 10, and generates a signal for performing following two functions. One is to store information from the core unit 10 in the memory 904, and the other is to read image information from the memory 904 and transmit it to the signal line 955. A dual port memory 903 is connected to the CPU 1003 of the core unit 10 via a signal line 953 and the connector 900, and to the CPU 906 of the image memory 9 via a signal line 957. Thereby, the CPU 1003 and the CPU 906 can interchange commands between them through the dual port memory 903.

The 8 bit multiple value image signal from the reader 1 is inputted into the memory controller 905 via the connector 900 and a signal line 954. The memory controller 905 controls the timing signal generator 902 to generate a timing signal in accordance with a signal from the core unit 10 via the signal line 952, and outputs the timing signal to a signal line 956. Data on the signal line 954 is stored in the memory 904 in correspondence with the timing signal. The CPU 906 connects the memory 904 which is connected to the memory controller 905 to the CPU bus 957. The CPU 906 sequentially reads image information out of the memory 904 and transmits it to the dual port memory 903. The CPU 1003 of the core unit 10 reads the image information in the dual port memory 903 of the image memory 9 via the signal line 953 and the connector 900, and transmits the read image information to the computer interface 7. The transmitting process of the information from the computer interface 7 to the network has been explained above, thus omitting the explanation.

Operation of the Core Unit 10 Corresponding to Information of the Image Memory 9

A case where information is outputted to the image memory 9 will be explained next.

The CPU 1003 communicates with the CPU 122 of the reader 1 via the communication IC 1002, and issues a scanning instruction of scanning an original. The reader 1 controls the scanner unit 104 to scan an original in accordance with the scanning instruction, and outputs the obtained image information to the connector 120. The reader 1 is connected to the device controller (external device) 3 by a cable, and the information from the reader 1 is inputted to the connector 1001 of the core unit 10. The image information inputted to the connector 1001 is transmitted to the LUT 1011 via the buffer 1010 as an 8 bit multiple value signal of the signal line 1057. An output signal from the LUT 1011 (on the signal line 1059) is transmitted to the image memory 9 as multiple value image information via the selectors 1013, 1014, 1016 and connector 1009. The image information thus stored in the image memory 9 is now sent to the CPU 1003 via a CPU bus 1054 of the connector 1009. The CPU 1003 transmits the data sent from the image memory 9 to the above-described computer interface 7. The computer interface 7 transmits the data to the network using a desired interface out of three kinds of interfaces, 10BASE5, 10BASE 2, and 10BASE-T.

Next, a case where information is received from the image memory 9 will be described.

First, image information is sent from the network to the core unit 10 via the computer interface 7. If the CPU 1003 of the core unit 10 determines that the data sent from the computer interface 7 via the CPU bus 1054 has any relationship with the image memory 9, then transmits the data to the image memory 9 via the connector 1009. Then, the image memory 9 transmits an 8 bit multiple value signal to the selectors 1014 and 1015 via the connector 1009 and the signal line 1064. The output signal from the selector 1014 or 1017 is outputted to the printer 2 in accordance with an instruction of the CPU 1003 and an image is formed on a recording paper sheet in the same manner as in the case of the facsimile unit.

AE Processing

Figure 12:
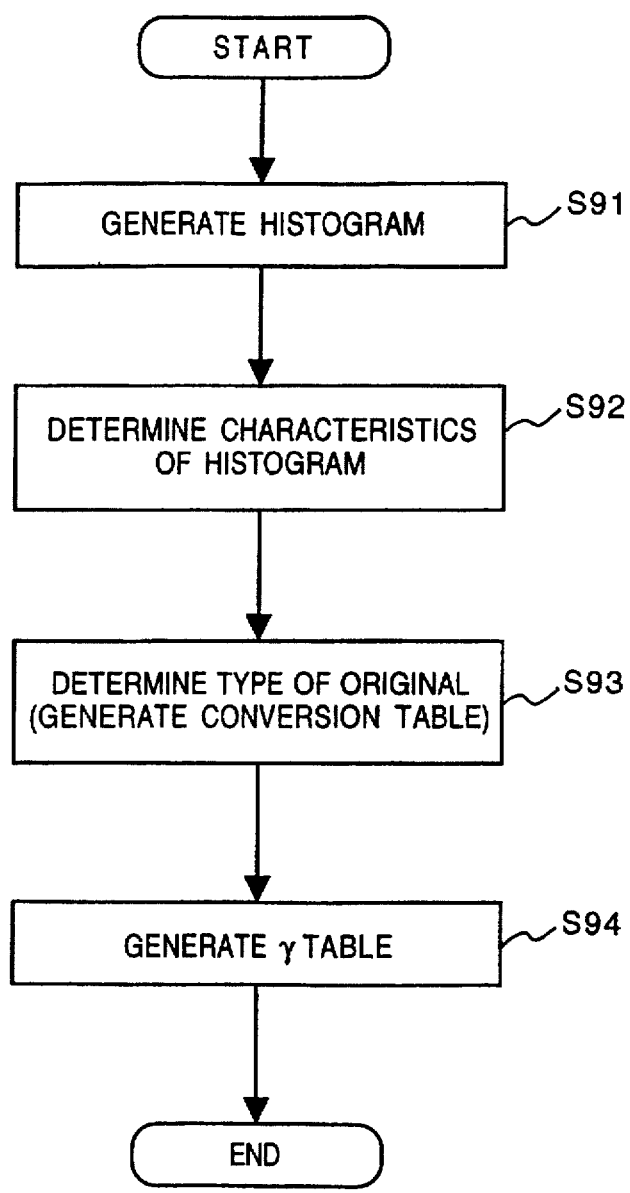
FIG. 12 is a flowchart showing an operation of an AE process in a histogram generator.

An AE (automatic exposure) process performed in the image processing unit 110 of the reader 1 will be explained. FIG. 12 is a flowchart of the AE processing in which density conversion is performed on the basis of a histogram.

First at step S91 and S92, a histogram is generated, then characteristics of the histogram is determined. At step S93, the type of original is determined, and a conversion table corresponding to the determined type is made. Finally, at step S94, a γ table including the conversion table is made and written in the density correction unit 36 of the image processing unit 110.

Figure 13:
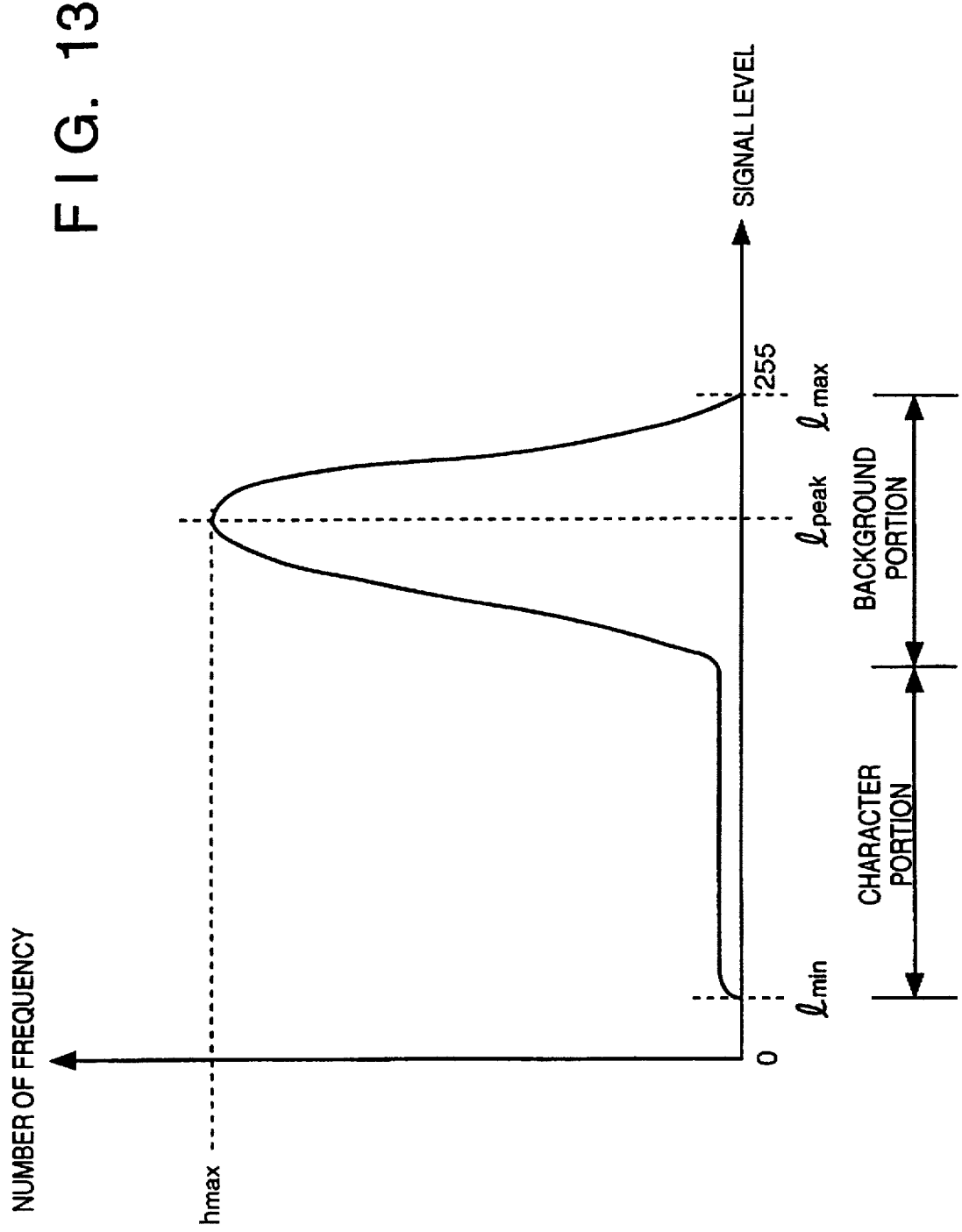
FIG. 13 shows characteristics of a density histogram of an original document.

FIG. 13 shows a typical histogram of an original. The example shown in FIG. 13 is a histogram of an standard original which is most commonly seen, and its characteristics is that background of about the same density spreads in a broad area of the original, and on top of it, letters or the like of greater density than that of the background are written. The horizontal axis denotes luminance signal level. The vertical axis denotes the number of occurrence, and represents ratio with respect to entire occurrences.

All the local or global maxim of the histogram are checked in order to analyze the shape of the histogram. Accordingly, referencing to the luminance level having the global maximum of the number of occurrence, the darker side (a left portion in FIG. 13) is recognized as character portion, whereas the lighter side (a right portion in FIG. 13) is recognized as a background portion. Note that information on these can be used not only for the AE process by the image processing unit 110 of the reader 1 but also as a threshold for binarization process when the reader 1 is used as a scanner, and as a parameter for a process in the image memory 9.

Control Panel

Figure 14:
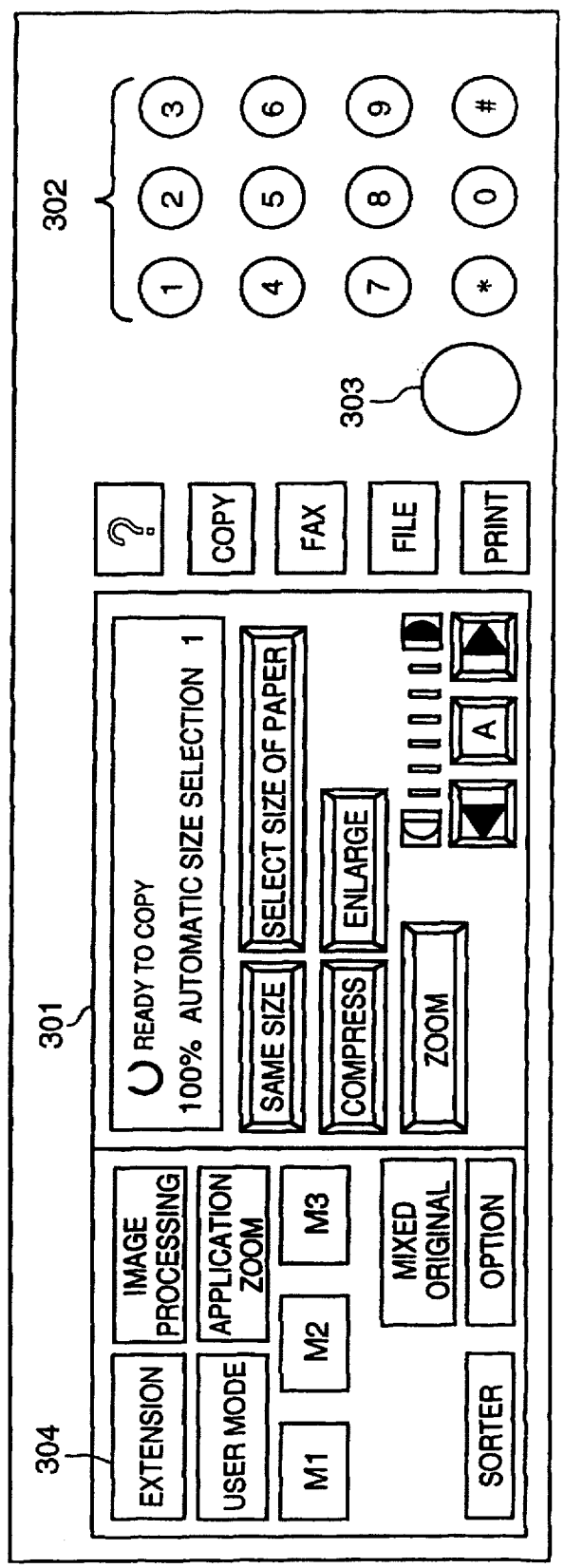
FIG. 14 is a plane view of an example of a control panel provided in the reader.

FIG. 14 is a plane view showing an example of a control panel provided in the reader 1.

In FIG. 14, reference numeral 301 denotes a display which displays operational state and messages. Further, reference numeral 302 denotes a numeric keys for inputting numbers. Reference numeral 303 denotes a start key, and an operation starts by pressing the start key.

Further, a service mode can be selected by performing a special operation, and it is possible to set data in the backed up memory inside and to set a default value when the device is powered on.

FIGS. 15 to 20 are flowcharts showing examples of processing sequences of functions in the MFU 20.

A processing sequence will be explained with reference to FIG. 15.

On the display 301 of the control panel, there are displayed selection keys for various kinds of operational mode, such as "COPY", "FAX", "FILE", "PRINT" and the like. A mode is selected by touching a part of the panel over the displayed selection key of interest. Accordingly, the selected mode is determined whether or not it is a copy mode (step S100), and if it is, the process moves to step S112 in FIG. 16. On the other hand if it is determined that a facsimile transmission mode is selected at step S104 in FIG. 15, the process moves to the step S130 in FIG. 17. Further, if it is determined that a file mode is selected at step S106, then the process goes to the step S140 of FIG. 18. If it is determined that a input mode from the computer interface 7 is selected at step S108, then the process moves to S160 in FIG. 19. Further, if it is determined that a facsimile reception mode is selected at step S110, then the process proceeds to step S170 in FIG. 20.

Figure 32:
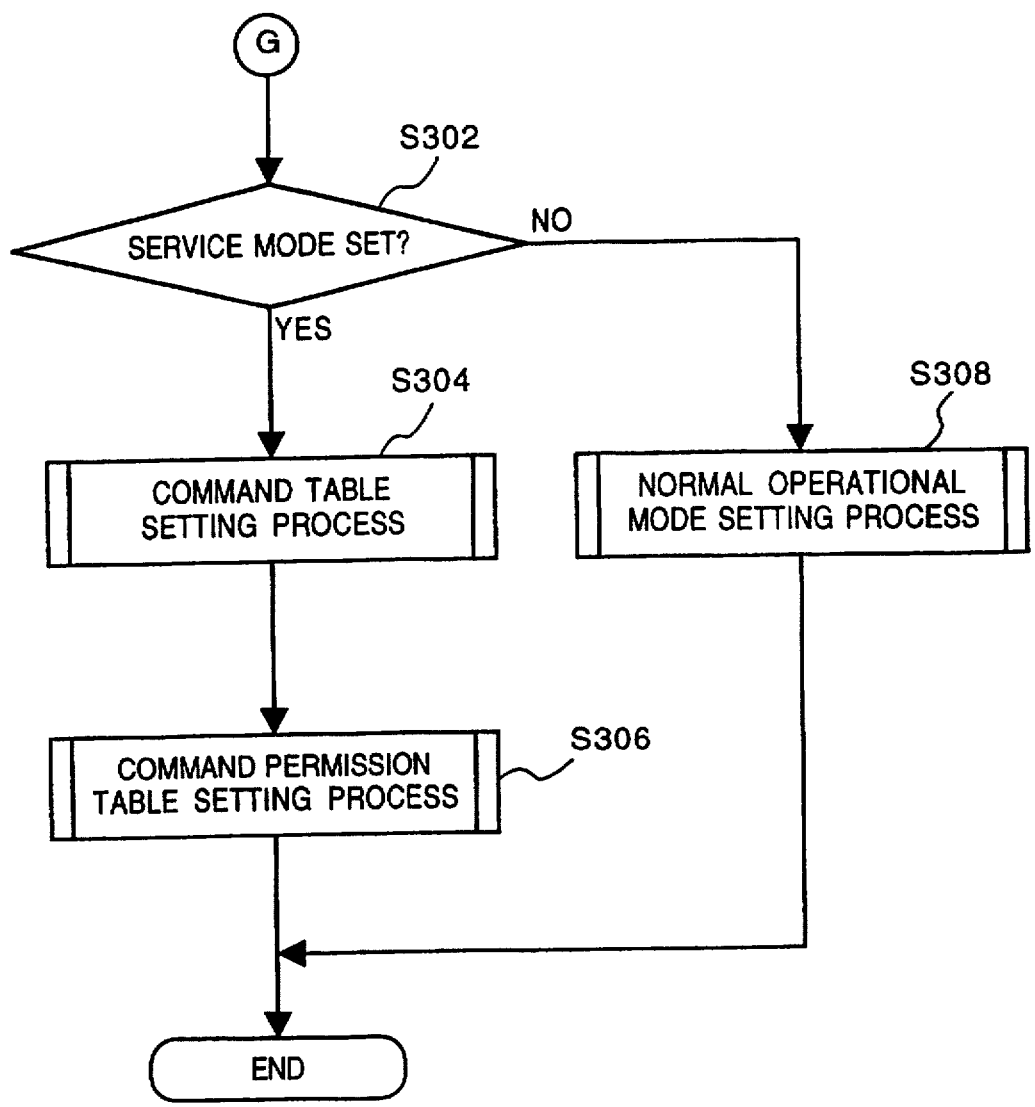
FIG. 32 is a flowchart showing a method of setting the command table and the command permission table.

If no mode is determined at steps S102 to S110, then the process proceeds to a processing sequence shown in FIG. 32. FIG. 32 will be described later in detail.

When the copy mode is selected, initialization of the copying operation is performed at step S112 (FIG. 16), and keys inputted from the control panel are determined at step S114 and set the copying conditions, then the system waits until the start key 303 is pressed at step S116. Subsequently, when the start key 303 is pressed, an original is scanned by the reader 1 (step S118) and printed by the printer 2 (refer a printing process described above) at step S120.

Figure 17:
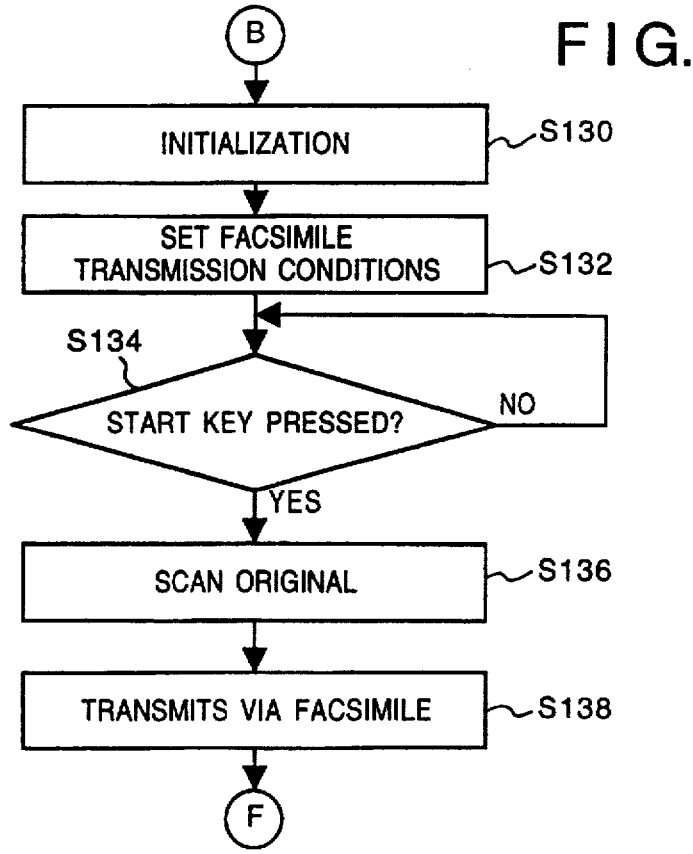
FIG. 17 is a flowchart showing an operation when a facsimile transmission function is executed.

When the facsimile transmission mode is selected, the operation of the flowchart in FIG. 17 is started. First at step S130, initialization of facsimile transmission is performed, then keys inputted from the control panel are determined and facsimile transmission conditions are set at step S132. At step S134, the system waits until the start key 303 is pressed. When the start key 303 is pressed, an original is scanned by the reader 1 at step S136, and the image data is sent to the facsimile unit 4. The facsimile unit 4 transmits the image data via facsimile in accordance with the set format and the predetermined protocol (step S138), and, after the transmission, the process goes back to step S112.

Figure 18:
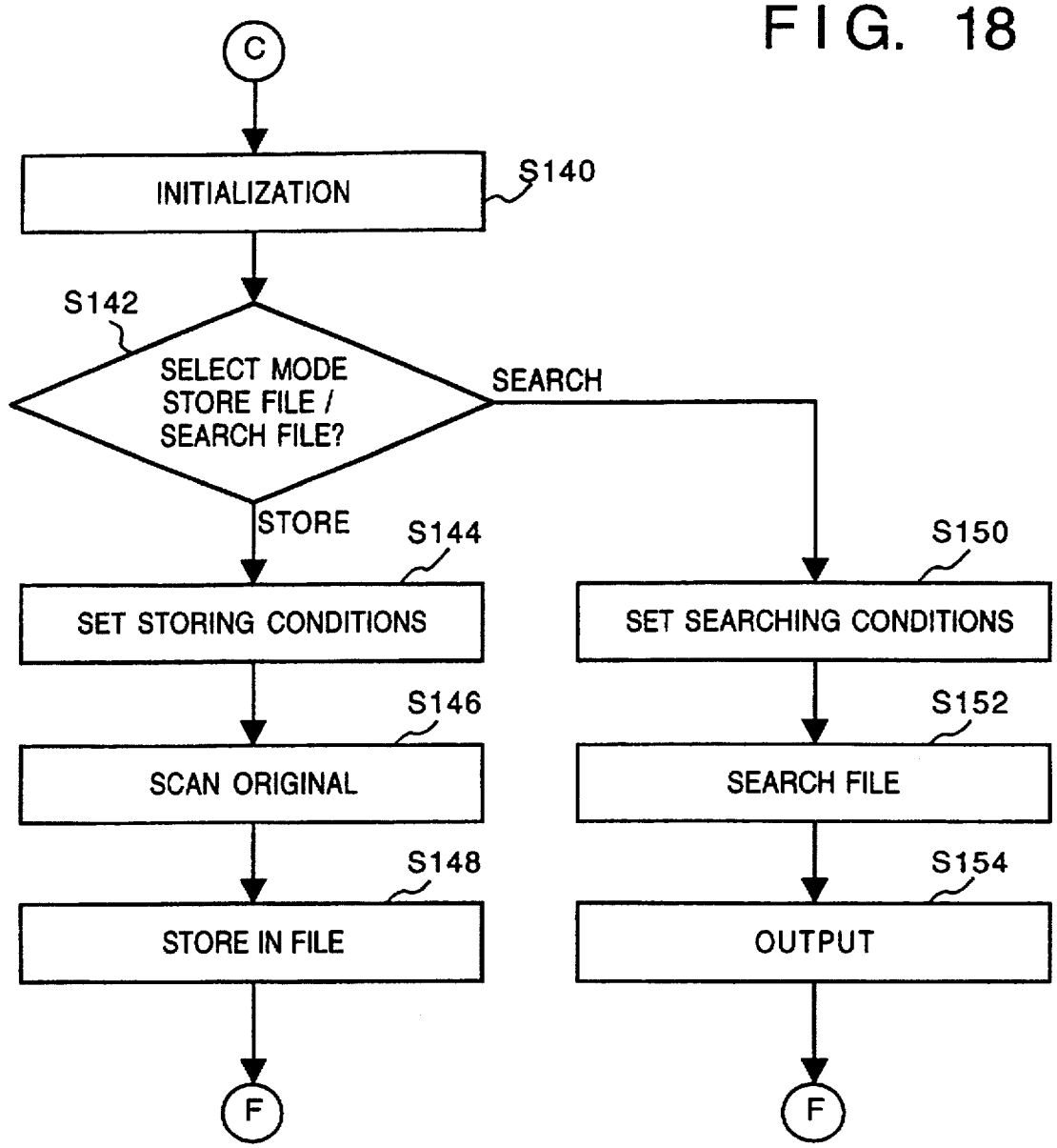
FIG. 18 is a flowchart showing an operations when a filing function is executed.

Further, if a file mode is selected, an operation shown in a flowchart in FIG. 18 is started. First, initialization of filing operation is performed at step S140. Modes to be selected, "store file" and "search file", are displayed on the control panel 301 to prompt a user to press one of them. With pressing of the "store file" key, storing conditions are set at step S144 and an original is scanned by the reader 1 at step S146. Then the image data is sent to the filing unit 5 at step S148 and stored in the external storage unit 6 of the filing unit 5.

Whereas, with pressing of the "search file" key, searching conditions are set at step S150, a file is searched from the external storage unit at step S152, and the result is outputted at step s154.

After the completion of storing or searching a file, the process goes back to step S100 for initialization.

Figure 19:
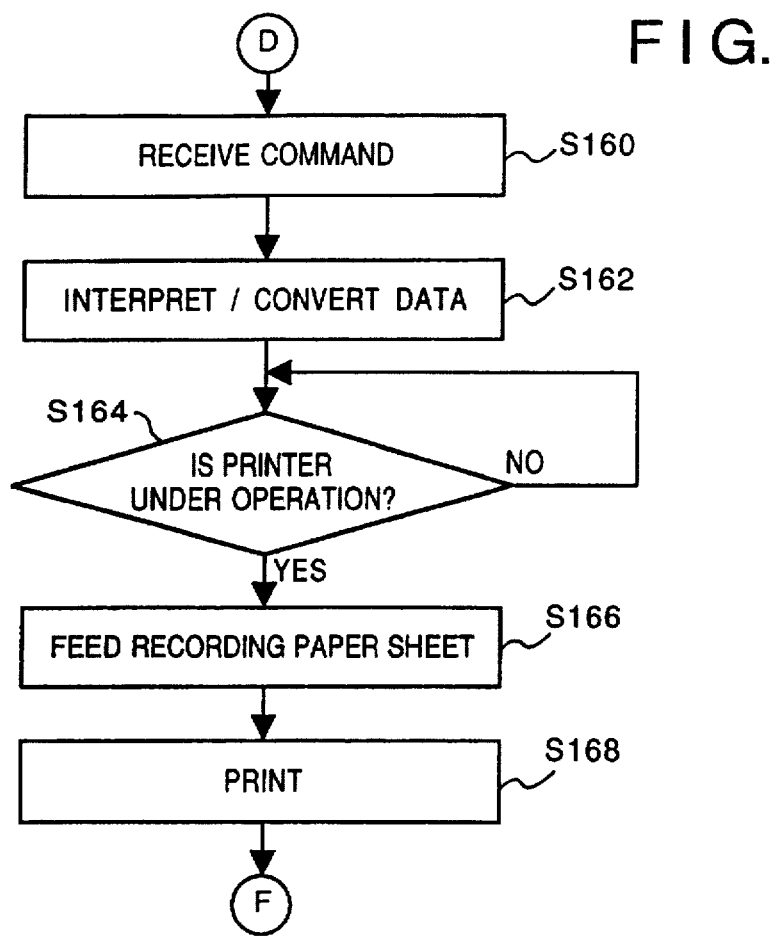
FIG. 19 is a flowchart showing an operation when an external input function is executed.

If a command data is inputted from outside via the LAN 13 (YES, at step S108), operation shown in the flowchart in FIG. 19 is started. First at step S160, the command is received at the computer interface 7, and sent to the formatting unit 8 via the core unit 10 and interpreted there, then the formatting unit 8 develops the information on a bit map memory. Subsequently, whether or not the printer 2 is under operation is determined at step S164, and if it is, the system waits until the former operation is completed. When the former operation is completed, then the proper recording sheet is selected at step S166, and starts being fed. The recording paper sheet fed from the transfer sheet storage units (recording sheet cassettes) 204 and 205 will be conveyed to the transferring unit 206. At this time, the image data developed in the bit map memory at step S162 is applied with rotating process in accordance with the direction of the recording paper sheet and its size, and read out. The read image data is transmitted to the exposure controller 201 which performs aforesaid printing process at step S168. After the completion of the printing, the process moves back to step S100 for initialization.

Figure 20:
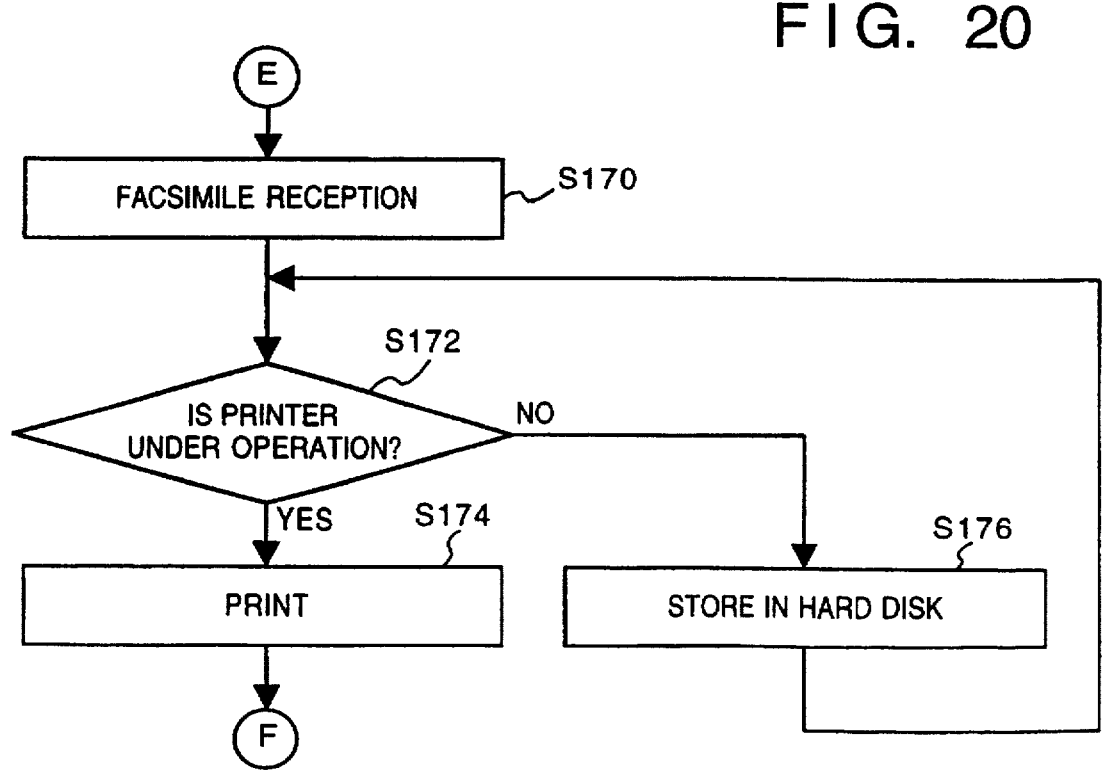
FIG. 20 is a flowchart showing an operation when a facsimile reception function is executed.

When data is received via facsimile (YES at step S110), the flow shown in FIG. 20 is started. First at step S170, the system recognizes that the start of receiving data via facsimile. Then, at step S172, whether or not the printer 2 is under operation is determined, and if it is, the system waits until the former operation is completed. When the former operation is completed, then a proper recording sheet is selected and the received image is printed on it at step S174.

Network Interface

Figure 21:
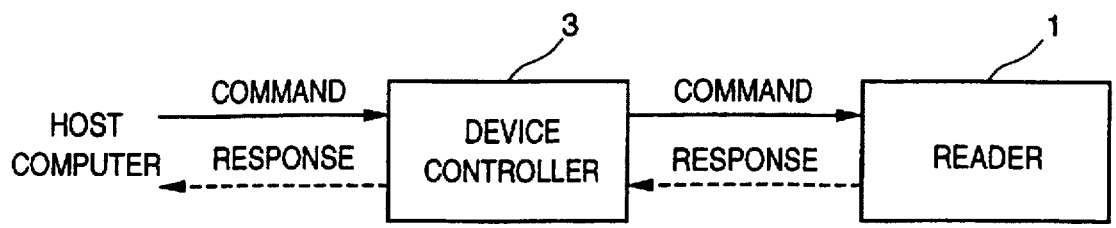
FIG. 21 is a drawing showing relationship between a host computer (workstation, for instance) and a device controller.

FIG. 21 shows relationship of a command and response between the device controller 3 (includes the core unit 10) and the reader 1 (includes the image processing unit 110).

As for commands, there are a status request command (FIG. 22), an error information request command (FIG. 23), a reader start command (FIG. 24), an AE data request command (FIG. 25), an image processing setting command (FIG. 26), a changing table command, and so on, as described later.

If the instruction from a computer, such as the workstation 10A in FIG. 1, is for reading an image by using the reader 1, the content of the instruction (command) is interpreted by the core unit 10 in the device controller 3 first, then sent to the reader 1.

The reader 1 interprets such the command and responses. The CPU (not shown) of the reader 1 sets a process corresponding to the command in the image processing unit 110 in FIG. 4.

Figure 22:
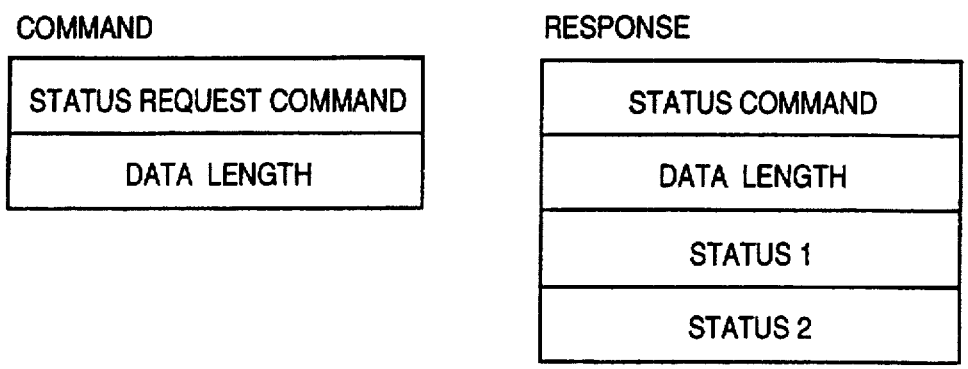
FIG. 22 shows relationship between a command and a response regarding a status request command.

FIG. 22 shows a common format of the response sent in correspondence with the status request command. The status response consists of information on data length and status words 1 and 2. Therefore, when the device controller 3 issues a status request command, the reader 1 response with status information 1 and 2. As for the status information, there are a busy signal and an error information of a scanner or a printer, and the like.

Figure 23:
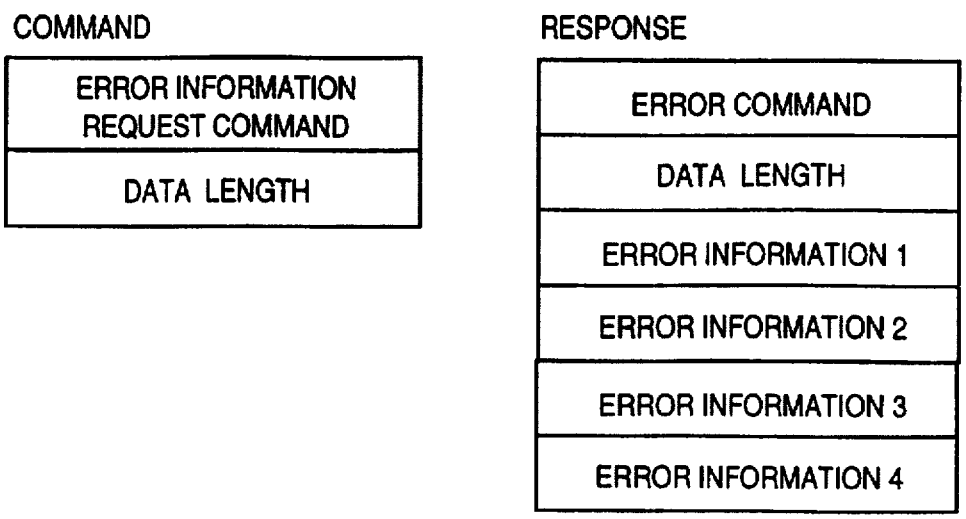
FIG. 23 shows relationship between a command and a response regarding an error information request command.
Figure 24:
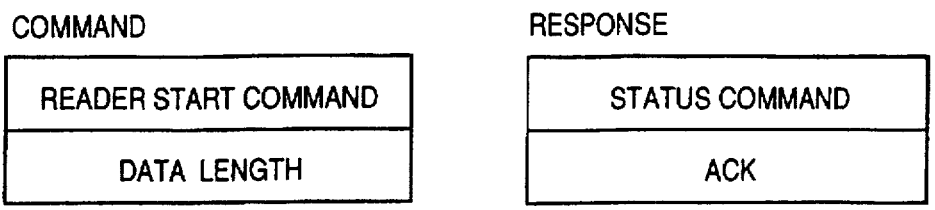
FIG. 24 shows relationship between a command and a response regarding a reader start command.

FIG. 23 shows correspondence in which, when error information of the reader 1 is requested by the error information command, the reader 1 response with error information 1, 2, 3, and 4. As the error information, there are a service error, printer jamming, and so on. As shown in FIG. 24, in response to the reader start command, an ACK is sent back.

Figure 25:
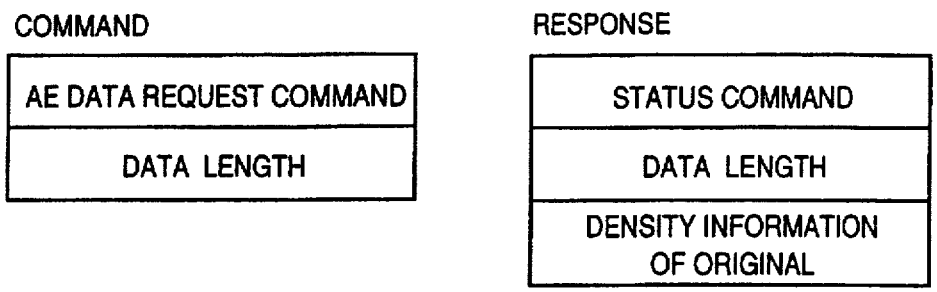
FIG. 25 shows relationship between a command and a response regarding an AE data request command.

Further, as seen in FIG. 25, in response to the AE data request command, density information of an original is sent back. The density information of the original includes the local and global maximum values obtained from the histogram described with reference to FIG. 13 and the type of the original.

Figure 26:
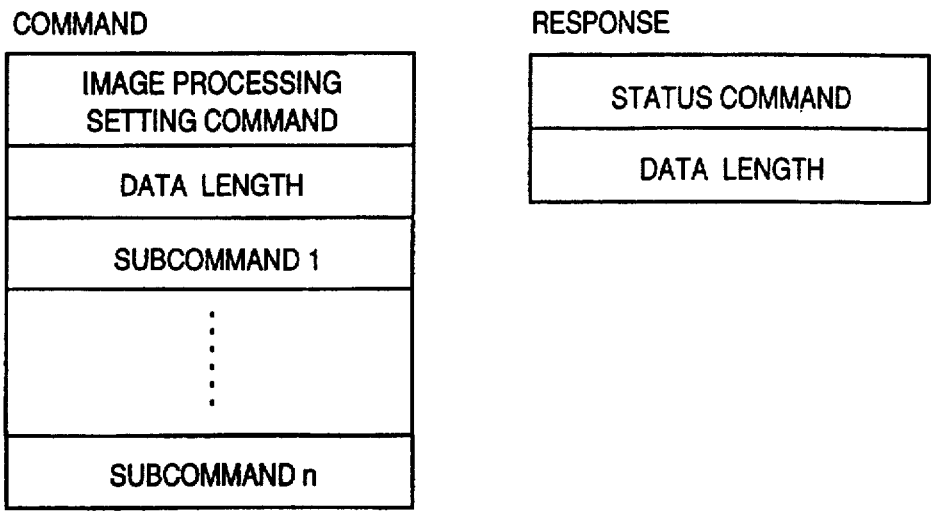
FIG. 26 shows relationship between a command and a response regarding an image processing setting command.

As shown in FIG. 26, one image processing setting command may include n-subcommands. The subcommands decide the contents of image processing.

Figure 27:
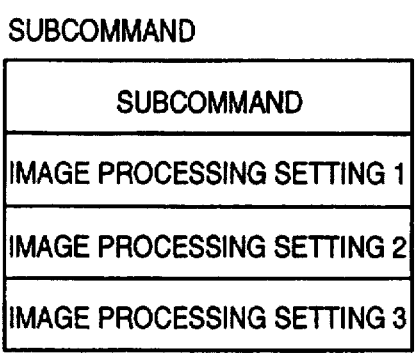
FIG. 27 shows subcommands in the image processing setting command.

A single subcommand can determine the contents of three kinds of image processing as shown in FIG. 27. As the contents of the image processing, there are hatching, negative-positive inversion, image quality adjustment, color patterning, italicizing letters, mirror imaging, and the like. Subjects which can be processed at the image processing unit are set as subcommands.

Function Management

As apparent from FIGS. 25 to 27, each device connected to the network in FIG. 1 is set with various kinds of functions. Then, ①: In any case where each function is executed, a common command system among devices connected to the network is necessary in order to designates each function. The command system is as shown in FIGS. 21 to 27.

②: The directive devices (devices connected to the network is commonly called "node", and especially, a node in the side of using the function is called "directive node", hereinafter) are necessary to know which node has what functions. It is possible to instruct the directive devices (node which is used its function is called "functional node", hereinafter) without knowing what functions the functional node has. However, it is ineffective in that the directive node knows that the functional node is not capable of executing the instructed function after the functional node interprets the instruction. Thus, each node has a command table (will be explained later) in this system. The command table is for determining functions which can be executed in the node having the command table.

③: Further, there is a case in which special preprocessing is necessary, or details of an identical function differ in dependent upon manufacturers, for example. Accordingly, a satisfactory processing may not be performed on the network by merely standardizing the command system. For example, regarding the aforesaid AE process, the details of designating ways are different depending upon manufacturers. Thus, in this system, a command permission table, described later, is held by each function in each node. The command permission table has information on entries in other nodes connected in the network, and shows that the permission to use the function of the node is issued to which directive node.

Figure 28:
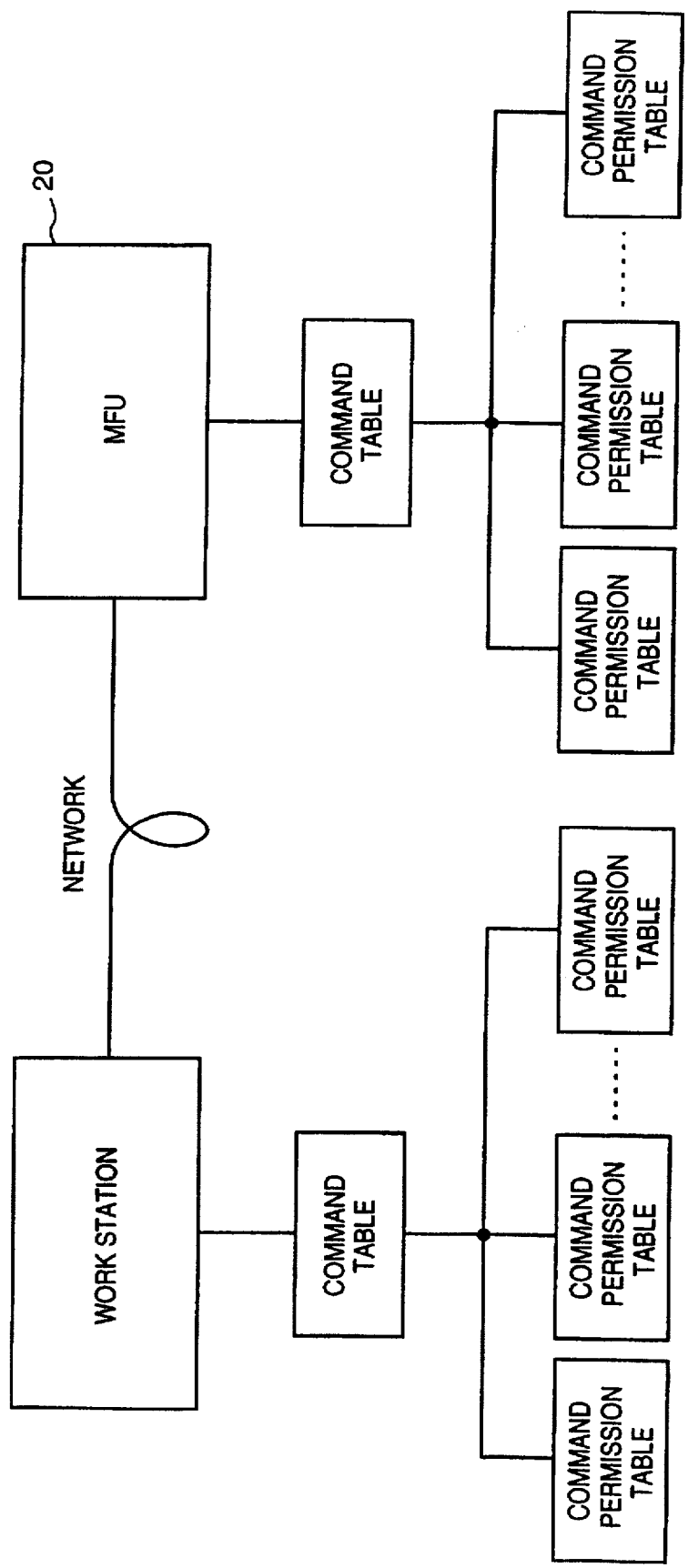
FIG. 28 is a drawing showing relationship between a command table and a command permission table in a workstation and the MFU.

FIG. 28 shows a drawing in which a single workstation and the MFU 20 in FIG. 3 are connected to the LAN 13, which is a simplified network version of FIG. 1. Since the MFU 20 has various kinds of functions as described above, it also has the "command table" and the "command permission table". The workstation as a directive node can also have the command table and the command permission table.

An example of the command table provided in the MFU 20 is shown in FIG. 29, and an example of the command permission table also provided in the MFU 20 is shown in FIG. 30.

In FIG. 29, "00", "01", and the like are command codes. In other words, the MFU 20 is capable of executing functions corresponding to the commands "00", "01", "02", "03", and "04". In the MFU 20 of the embodiment, the code for the AE data request command is "01".

FIG. 30 shows an example of the command permission table provided in the MFU 20 for the workstations 10A and 10B. The MFU 20 connected to the network in FIG. 1 contains the command permission tables of other nodes connected to the same network. More specifically, if n-nodes are connected to the network, the MFU 20 has n−1 command permission tables, at most.

When a command whose code is not registered in the command table is issued to the MFU 20, the MFU 20 response to the directive node that a function designated by the command can not be executed.

The command permission table includes numeral values, "1" and "0". "1" indicates that functions corresponding to commands are available, and "0" indicates that functions corresponding to commands are not available. The command table and the command permission table are set in pair. For example, the second entry data of the command permission table in FIG. 30 is "0", and the second entry of the command table in FIG. 29 is an AE data request command. In this case, it shows that the workstation 10A is not permitted to use the AE data request command in the MFU 20. Even if the AE data command can be executed by the MFU 20 as shown in FIG. 29, the workstation 10A can not use the command. According to the examples of FIGS. 29 and 30, the MFU 20 is capable of executing functions corresponding to the commands "00", "01", "02", "03", and "04", however, when the relationship between the MFU 20 and the workstation 10A is considered, only the functions corresponding to the commands "00", "02", "03", and "04" are allowed to be designated by the workstation 10A.

If a command which is registered to be executable in the command table, but which is registered that "not permitted" in the command permission table is sent from a directive node to the MFU 20, the MFU sends back a response indicating "not permitted" to the directive node.

Figure 31:
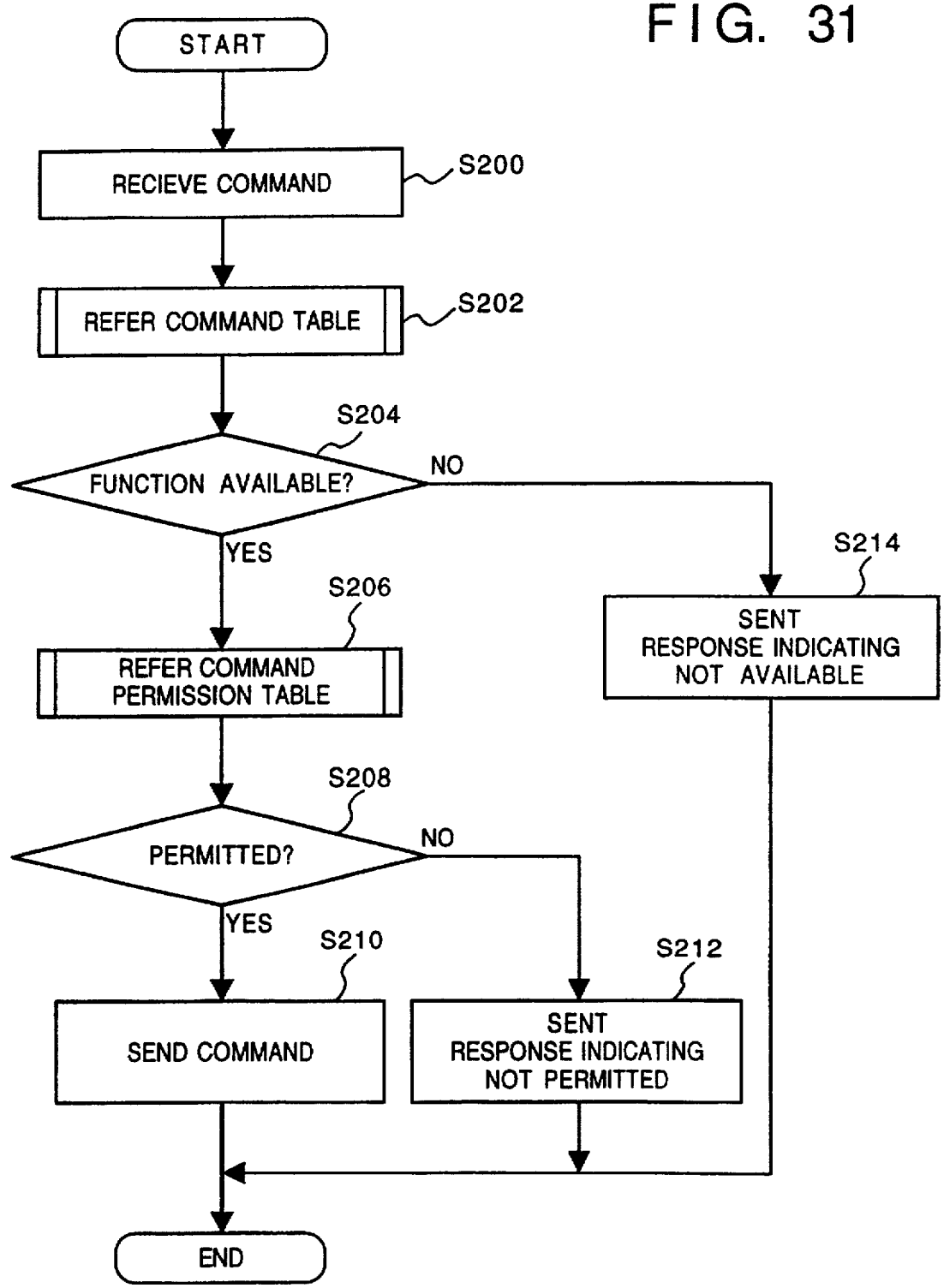
FIG. 31 is a flowchart showing an operational sequence for controlling the use of the table in the MFU.

FIG. 31 shows an operational sequence of the MFU 20 operated by the device controller 3. This is for determining whether or not a command sent from other directive node (through the computer interface 7) designates an executable function in the MFU 20, and whether or not the command is permitted for the directive node to issue.

At step S200, a command from other node connected to the network is received. At step S202, a stored command table is referred, then at step S204, it is checked whether or not the command corresponds to a function which can be executed by the MFU 20. If the function is not available in the MFU 20, the process moves to step S214, and the MFU 20 sends back a response indicating that the function designated by the command can not be executed to the directive node.

Whereas, when it is determined that the function can be executed by the MFU 20, the process moves to S206 where a command permission table (in FIG. 30) is referred. Then at step S208, whether or not the command is permitted to the directive node is determined. If so, the command is sent to the corresponding image processing unit 110 in the reader 1 or the printer 2. If not, the MFU sends to the directive node a response indicating it is not permitted.

Setting the Tables . . . The First Method

Since the command table is for setting functions of each node, it can be set when the "service mode" is set in MFU 20 in the embodiment.

FIG. 32 is a flowchart showing a flow of setting the table in the MFU 20. The control sequence is of MFU 20, however, by installing an identical program capable of performing the control sequence in a desired node, a table can be set in the node.

Figure 15:
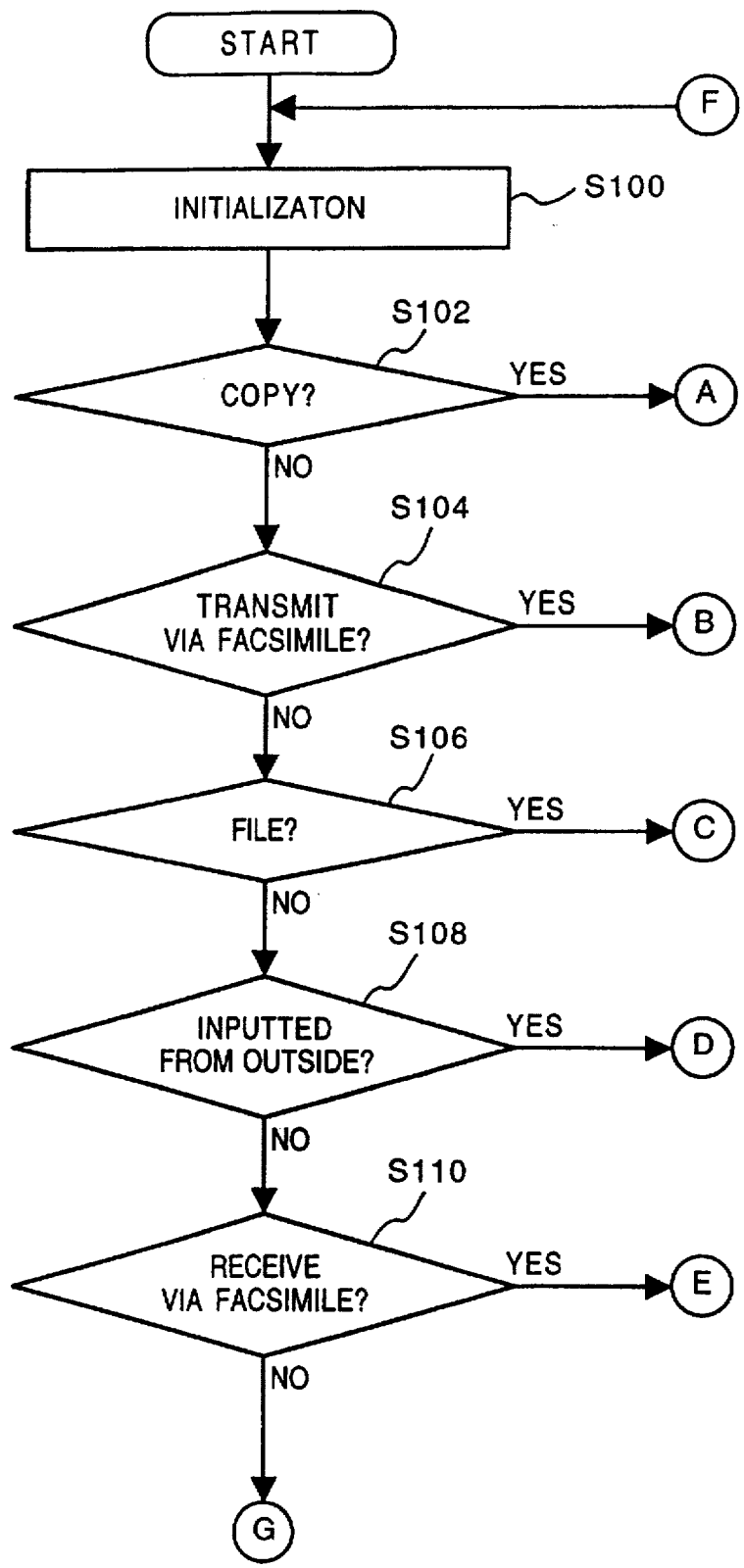
FIG. 15 is a flowchart showing an example of a processing sequence of each function of the MFU.
Figure 16:
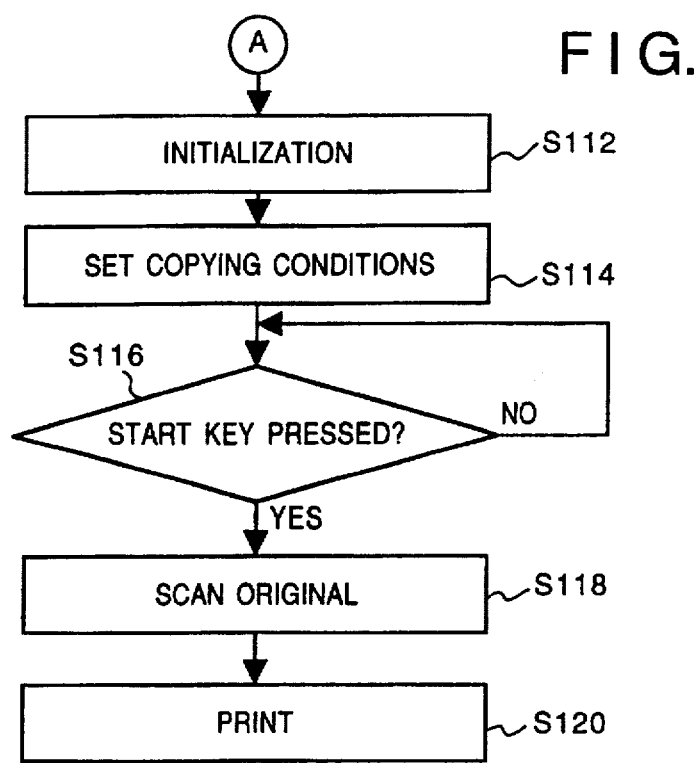
FIG. 16 is a flowchart showing an operation when a copying function is executed.

When it is determined that no mode is determined at steps S102 to S110 in the control sequence in FIG. 15, the process proceeds to the control sequence in FIG. 32. Whether or not the service mode is set is determined at step S302 in FIG. 32. When a user presses an "extension" key 304 in FIG. 14, the "service mode" is displayed on the display (not shown in FIG. 14). By pressing the portion displaying the "service mode", the process prepares to process the "service mode". When the service mode is not set, the normal operational mode is set at step S308.

When the service mode is selected by a user, a "command table setting process" is performed at step S304, substantially, a "command permission table setting process" is performed at step S306.

Figure 33:
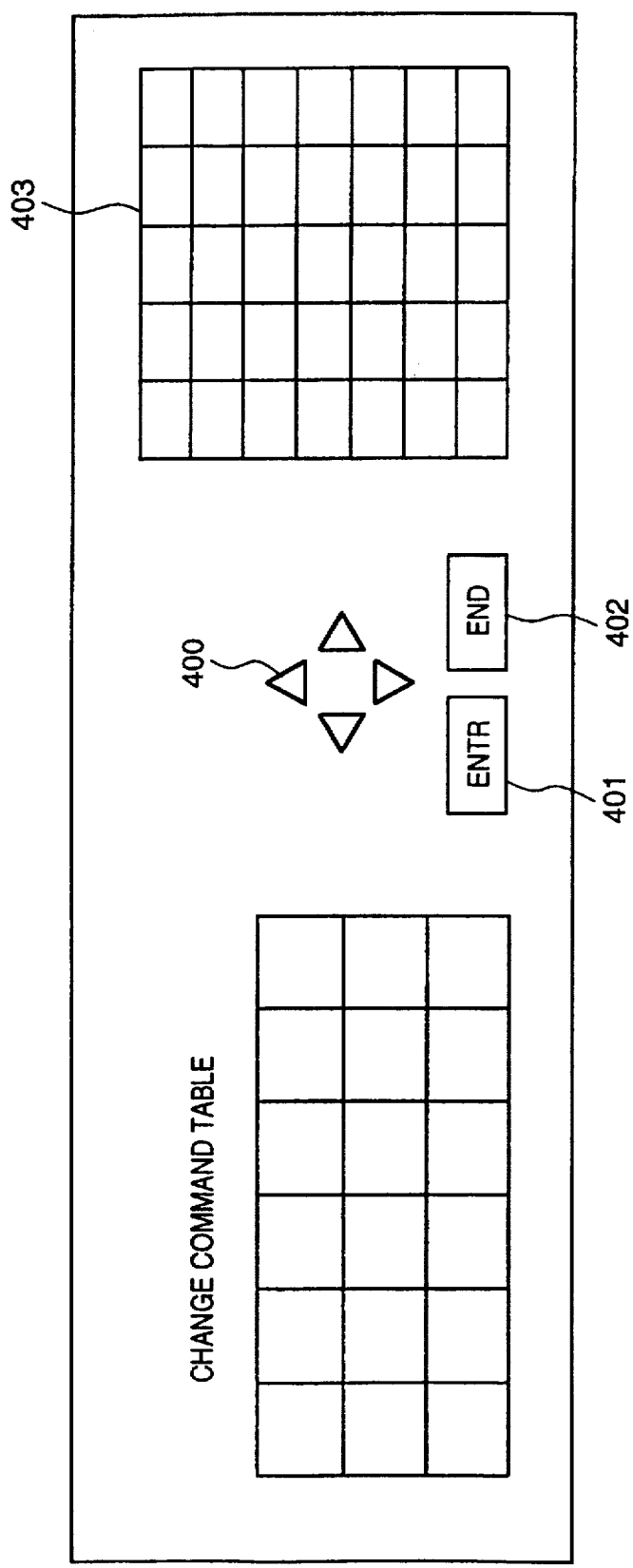
FIG. 33 is a drawing of the display screen of the MFU at setting the command table.

After the process at S304 has completed, a message which prompts to change the command table is first displayed on the display 301 (in FIG. 14) as shown in FIG. 33, then a part of a command table 404 (in FIG. 29), a cursor key 400, an ENTR key 401, and an END key 402 are displayed. In order to designates a specific subject in the shown table, a user controls a displayed cursor key 400. Data to be changed can be inputted by using the numeric keys 302 and other keys 403. Whenever a single subject is changed, the ENTR key 401 has to be pressed. At the end of the process, the END key is to be pressed.

The operation of setting the command permission table (step S306) is practically the same as the operation shown in FIG. 32.

As described above, to set and change the command table and the command permission table of the MFU 20 as a data processing device become possible. Accordingly, when the MFU 20 is connected to the network for the first time, or when a new optional function is added on the MFU and the function has to be registered so as to become executable, the control operation shown in FIG. 32 is executed.

Regarding changing the table, it is assumed that a user is familiar with functions of commands and the like. However, some users may not know commands well. In that case, a user who is not familiar with commands may destroy the tables. In order to avoid this trouble, it is possible to insert extra steps, such as a step of inputting passwords and a step of confirming the password between step S302 and step S304. The password may be notified to only those who are familiar with commands.

Setting the Tables . . . Second Method

In the first method, a case where the command table or the command permission table is changed by using the control panel of the MFU 20. However, it is possible to change the tables by using other devices (e.g., the workstation 10B) on the network.

Figure 34:
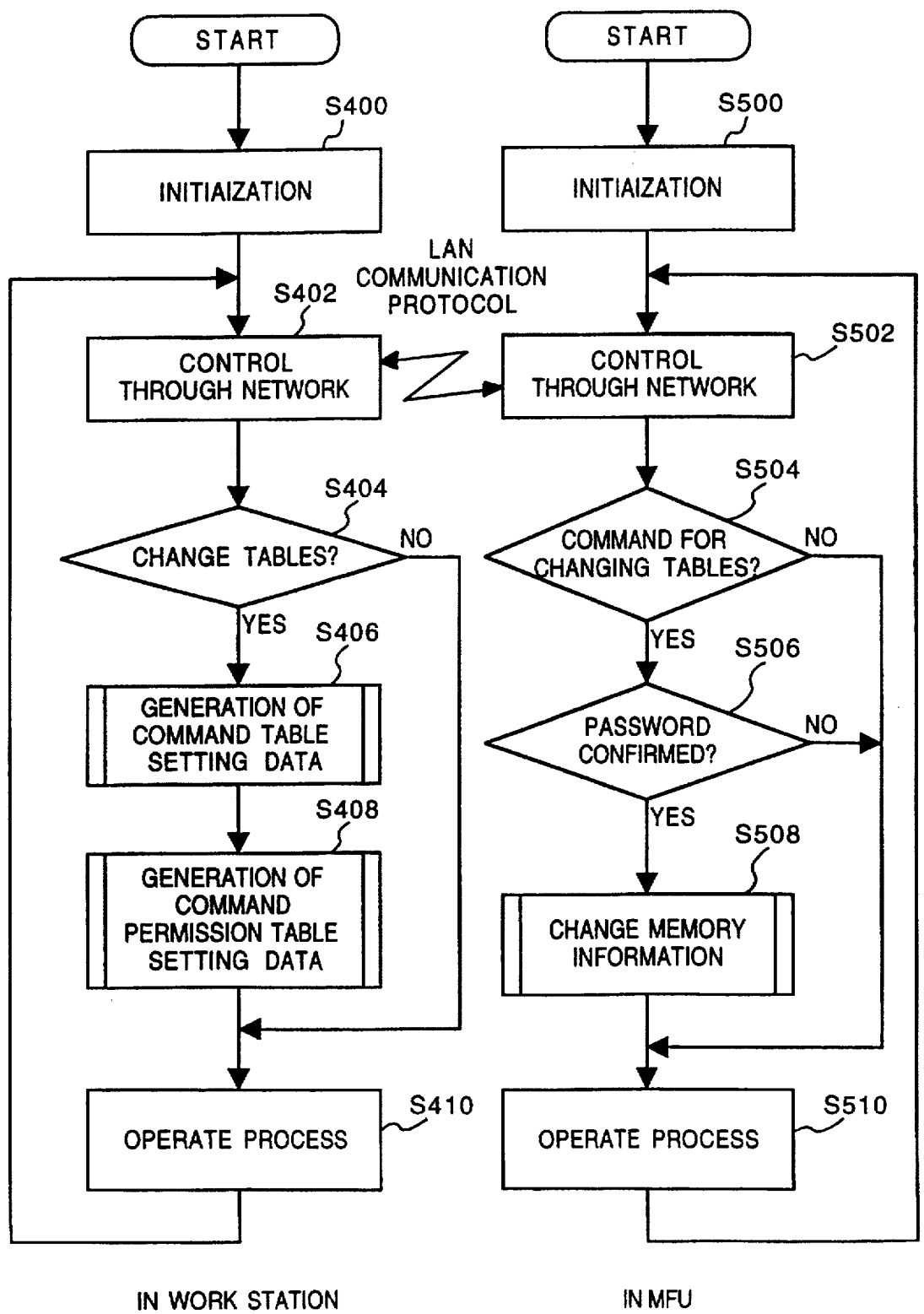
FIG. 34 is a flowchart showing an operational sequence when the tables are set (changed) from the workstation.

FIG. 34 shows a flowchart to change the tables by remote control from the workstation 10B which is used as a directive node. The flowchart illustrates procedures for the workstation 10B and the MFU 20.

Further, a command system for changing the tables from a directive node is shown in FIG. 35. The code of changing tables is "10". A node ID is an identifier of the directive node on the network. "Manufacturer password" is a password of the directive node set by an manufacturer. Further, "user password" is a password of a user who changes the tables. Both the "maker password" and the "user password" are set in the MFU 20 in advance. Operation to change the tables by users who do not have registered passwords is rejected.

A "table identifier" is for identifying the table which the table changing command changes. If the table identifier is "0", the command table is to be changed, whereas if it is "1", the command permission table is to be changed.

An "entry point" designates the position in the table. To change the table from the workstation 10B, the similar display to that shown in FIG. 33 is on the display screen of the workstation 10B. When a user designates the position in the table by using a cursor or the like, the position is stored in the "entry point", and the changed data is stored in "data".

When the workstation 10B is powered on, it is initialized at step S400 in FIG. 34. On the contrary, when the MFU 20 is powered on, it is initialized at step S500.

Normally, at the step S402 for the workstation 10B and at the step S502 for the MFU 20, a LAN communication protocol is performed and data is interchanged. Data to be interchanged is prepared at steps S404 to S410 for the workstation 10B and at steps S504 to S510 for the MFU 20.

When a user changes the tables from the workstation, data for setting the command table is generated at step S406. Further, at step S408, data for setting the command permission table is generated. At step S410, thus generated data is converted to that in the command form shown in FIG. 35. The command generated at step S410 is sent to the MFU 20 through the network at step S402.

When the MFU receives the command, it then determines that the command is for changing the tables at step S504. Then at step S506, it is checked whether the "manufacturer password" and the "user password" match the passwords in the memory. Only when the passwords are confirmed, the contents of the "command table" and the "command permission table" corresponding to the "node ID" are changed at step S508.

A purpose of comparing user password is to confirm the qualification of the user who is operating to change the tables. A purpose of comparing the manufacturer passwords is to prepare for a case where operations of the same function differ because different manufacturers developed the function, and it is not permitted to change the tables when the manufacturers differ.

Other Modification

The present invention can be modified within the spirit and scope of it.

In the above embodiment, a case of controlling the MFU 20 as a data processing device having multiple functions, especially of controlling the image processing portion, is explained. However, the present invention can be also applied to facsimile, filing, or other equipment. Note that the present invention can be applied not only to a device having multiple functions but also to a device having a single function, needless to say.

Further, in the above embodiment, it is not permitted to change the tables when the manufacturer password is different, however, it can be changed so as to permit. In this case, a user in a directive node may be informed that the manufacturer password is unmatched or that a satisfactory function may not be achieved, and if the user understands (the user presses an OK key (not shown), for instance), then changing the tables may be allowed.

According to the present invention as described above, it is possible to provide a data processing system and a network system capable of changing information on functions (e.g., information on completion of setting, permission for operation, and permission for accessing), set in the data processing apparatus connected to the network, through the network.

As many apparently widely different embodiments of the present invention can be made without departing from the spirit and scope thereof, it is to be understood that the invention is not limited to the specific embodiments thereof except as defined in the appended claims.

What is claimed is:

1. A data processing apparatus connected to a communication network, having at least one data processing function, comprising:

storage means for storing information on the at least one data processing function;

first determining means for determining, based on the information stored in said storage means, whether or not a data processing request transmitted from a second data processing apparatus through the communication network is acceptable; and control means for controlling a data processing operation in accordance with the determination result of said first determining means;

wherein said first determining means comprises:

second determining means for determining, based on the information stored in said storage means, whether or not a data processing function requested through the communication network requested by the second data processing apparatus can be executed;

third determining means for determining, based on the information stored in said storage means, whether or not the second data processing apparatus is permitted to access the data processing function;

wherein said control means controls a data processing operation in accordance with the determination results of said second and third determining means.

2. The data processing apparatus according to claim 1, wherein when the data processing apparatus is capable of executing a plurality of functions, said storage means stores information for each of the plurality of data processing functions.

3. The data processing apparatus according to claim 2, wherein the information for each of the plurality of functions is stored in said storage means in table form.

4. The data processing apparatus according to claim 1 further comprising changing means for changing information stored in said storage means.

5. The data processing apparatus according to claim 4, further comprising mode setting means for setting a mode where the stored information is changed by said changing means.

6. The data processing apparatus according to claim 1, wherein the stored information indicates a data processing function which can be executed by the data processing apparatus and permission/rejection to access the data processing function for the second data processing apparatus.

7. The data processing apparatus according to claim 6, wherein information regarding permission/rejection to access the data processing function for the second data processing apparatus is stored in said storage means in table form.

8. The data processing apparatus according to claim 1, further comprising transmitting means for transmitting the determination result of said first determining means to the second data processing apparatus through the communication network.

9. The data processing apparatus according to claim 8, wherein said transmitting means transmits, as the determination result, a response indicating that the data processing request has not been accepted by the data processing apparatus.

10. The data processing apparatus according to claim 1, further comprising display means for displaying information stored in said storage means.

11. The data processing apparatus according to claim 10, wherein said display means displays the information stored in said storage means in accordance with an instruction from the second data processing apparatus.

12. A method for a data processing apparatus having at least one data processing function and connected to a communication network, comprising:

a storage step of storing information on the at least one data processing function of said data processing apparatus;

a first determining step of determining, based on the stored information, whether or not a data processing request transmitted from a second data processing apparatus though the communication network is acceptable; and a control step of controlling a data processing operation in the data processing apparatus in accordance with a determination result in said first determining step;

wherein said first determining step includes:

a second determining step of determining, based on the stored information, whether or not a data processing function requested by the second data processing apparatus through the communication network can be executed;

a third determining step of determining, based on the stored information, whether or not the second data processing apparatus is permitted to access the data processing function, wherein in said control step, a data processing operation is controlled in accordance with determination results of said second and third determining steps.

13. The method according to claim 12, wherein when the data processing apparatus is capable of executing a plurality of functions, information for each of the plurality of functions is stored in said storage step.

14. The method according to claim 13, wherein the information for each of the plurality of data processing functions is stored in table form.

15. The method according to claim 12, further comprising a changing step of changing the stored information.

16. The method according to claim 15, further comprising a mode setting step of setting a mode where the stored information is changed.

17. The method according to claim 12, wherein the stored information indicates a data processing function which can be executed by the data processing apparatus and permission/rejection to access the data processing function for the second data processing apparatus.

18. The method according to claim 17, wherein information regarding permission/rejection to access the data processing function for the second data processing apparatus is stored in table form.

19. The method according to claim 12, further comprising a transmitting step of transmitting a determination result obtained in said determining step to the second data processing apparatus through the communication network.

20. The method according to claim 19, wherein a response indicating that the data processing apparatus has not accepted a data processing request from the second data processing apparatus is transmitted to the second data processing apparatus as the determination result.

21. The method according to claim 12, further comprising a display step of displaying the stored information.

22. The method according to claim 21, wherein the stored information is displayed in accordance with an instruction from the second data processing apparatus.

23. A data processing apparatus, connected to a communication network, having at least one data processing function, comprising:

storage means for storing information on the at least one data processing function;

first determining means for determining, based on the information stored in said storage means, whether or not a data processing function requested through the communication network by a second data processing apparatus can be executed;

second determining means for determining, based on the information stored in said storage means, whether or not the second data processing apparatus is permitted to access the data processing function; and control means for controlling a data processing operation in accordance with the determination results of said first and second determining means.

24. The data processing apparatus according to claim 23, wherein when the data processing apparatus is capable of executing a plurality of functions, said storage means stores information for each of the plurality of data processing functions.

25. The data processing apparatus according to claim 24, wherein the information for each of the plurality of functions is stored in said storage means in table form.

26. The data processing apparatus according to claim 23, further comprising changing means for changing information stored in said storage means.

27. The data processing apparatus according to claim 26, further comprising mode setting means for setting a mode where the stored information is changed by said changing means.

28. The data processing apparatus according to claim 23, wherein the stored information indicates a data processing function which can be executed by the data processing apparatus and permission/rejection to access the data processing function for the second data processing apparatus.

29. The data processing apparatus according to claim 28, wherein information regarding permission/rejection to access the data processing function for the second data processing apparatus is stored in said storage means in table form.

30. The data processing apparatus according to claim 23, further comprising transmitting means for transmitting the determination results of said first and second determining means to the second data processing apparatus through the communication network.

31. The data processing apparatus according to claim 30, wherein said transmitting means transmits, as the determination result, a response indicating that the data processing request has not been accepted by the data processing apparatus.

32. The data processing apparatus according to claim 23, further comprising display means for displaying information stored in said storage means.

33. The data processing apparatus according to claim 32, wherein said displaying means displays the information stored in said storage means in accordance with an instruction from the second data processing apparatus.

34. A data processing method for a data processing apparatus having at least one data processing function and connected to a communication network, comprising:

a storage a step of storing information on the at least one data processing function of the data processing apparatus;

a first determining step of determining, based on the stored information, whether or not a data processing function requested by the second data processing apparatus through the communication network can be executed;

a second determining step of determining, based on the stored information, whether or not the second data processing apparatus is permitted to access the data processing function; and a control step of controlling a data processing operation in accordance with determination results of said first and second determining steps.

35. The method according to claim 34, wherein when said data processing apparatus is capable of executing a plurality of functions, information for each of the plurality of data processing functions is stored in said storage step.

36. The method according to claim 35, wherein information regarding permission/rejection to access the data processing function for the second data processing apparatus is stored in table form.

37. The method according to claim 35, wherein the information for each of the plurality of data processing functions is stored in table form.

38. The method according to claim 34, further comprising a changing step of changing the stored information.

39. The method according to claim 38, further comprising a mode setting step of setting a mode where the stored information is changed.

40. The method according to claim 34, wherein the stored information indicates a data processing function which can be executed by the data processing apparatus and permission/rejection to access the data processing function for the second data processing apparatus.

41. The method according to claim 34, further comprising a transmitting step of transmitting determination results obtained in said first and second determining step to the second data processing apparatus through the communication network.

42. The method according to claim 41, wherein a response indicating that the data processing apparatus has not accepted a data processing request from the second data processing apparatus is transmitted to the second data processing apparatus as the determination result.

43. The method according to claim 40, further comprising a display step of displaying the stored information.

44. The method according to claim 43, wherein the stored information is displayed in accordance with an instruction from the second data processing apparatus.

* * * * *